(12) United States Patent
Lo et al.

(10) Patent No.: US 10,699,119 B2
(45) Date of Patent: Jun. 30, 2020

(54) METHODS AND SYSTEMS FOR AUTOMATIC OBJECT DETECTION FROM AERIAL IMAGERY

(71) Applicant: GEOSAT Aerospace & Technology, Tainan (TW)

(72) Inventors: Cheng-Fang Lo, Tainan (TW); Zih-Siou Chen, Tainan (TW); Chang-Rong Ko, Tainan (TW); Chun-Yi Wu, Tainan (TW); Ya-Wen Cheng, Tainan (TW); Kuang-Yu Chen, Tainan (TW); Hsiu-Hsien Wen, Tainan (TW); Te-Che Lin, Tainan (TW); Ting-Jung Chang, Tainan (TW)

(73) Assignee: GEOSAT AEROSPACE & TECHNOLOGY, Tainan (TW)

( * ) Notice: Subject to any disclaimer, the term of this patent is extended or adjusted under 35 U.S.C. 154(b) by 0 days.

(21) Appl. No.: 16/724,041

(22) Filed: Dec. 20, 2019

(65) Prior Publication Data

US 2020/0125823 A1    Apr. 23, 2020

Related U.S. Application Data

(63) Continuation-in-part of application No. 15/367,975, filed on Dec. 2, 2016, now Pat. No. 10,546,195.

(51) Int. Cl.
*G06K 9/00* (2006.01)
*G06K 9/62* (2006.01)
*G06T 7/11* (2017.01)

(52) U.S. Cl.
CPC .............. *G06K 9/0063* (2013.01); *G06T 7/11* (2017.01); *G06T 2207/10032* (2013.01)

(58) Field of Classification Search
CPC .............. G06K 9/0063; G06K 9/00657; G06K 9/4671; G06K 9/6267; G06K 9/6201;
(Continued)

(56) References Cited

U.S. PATENT DOCUMENTS 7,212,670 B1   5/2007 Rousselle et al.
7,310,606 B2  12/2007 Nemethy et al.
(Continued)

FOREIGN PATENT DOCUMENTS

JP   2015-125092 A   7/2015
JP   2015-152340 A   8/2015

OTHER PUBLICATIONS

First Japanese Office Action issued in corresponding Application No. 2017-228695, dated Jan. 29, 2019.
(Continued)

*Primary Examiner* — Bobbak Safaipour
(74) *Attorney, Agent, or Firm* — Finnegan, Henderson, Farabow, Garrett & Dunner LLP

(57) ABSTRACT

Methods and systems for detecting objects from aerial imagery are disclosed. The method includes obtaining an image of an area, obtaining a plurality of regional aerial images from the image of the area, classifying the plurality of regional aerial images as a first class or a second class by a classifier, wherein: the first class indicates a regional aerial image contains a target object, the second class indicates a regional aerial image does not contain a target object, and the classifier is trained by first and second training data, wherein the first training data include first training images containing target objects, and the second training data include second training images containing target objects obtained by adjusting at least one of brightness, contrast, color saturation, resolution, or a rotation angle of the first training images; and recognizing a target object in a regional aerial image in the first class.

23 Claims, 24 Drawing Sheets

(58) Field of Classification Search
CPC .. G06K 9/4652; G06K 9/3233; G06K 9/6268;
G06K 9/6256; G06K 9/00711; G06T
7/11; G06T 2207/10032; G06T
2207/30242; G06T 2207/20081; G06T
2207/30188; G06T 2207/20084; G06T
2207/10028; G06T 7/74; G06T 7/73;
G01C 11/02

See application file for complete search history.

(56) References Cited

U.S. PATENT DOCUMENTS

| | | | | |
|---|---|---|---|---|
| 8,285,050 | B2* | 10/2012 | Ozawa | G01C 11/06 345/441 |
| 8,537,337 | B2* | 9/2013 | Welty | A01G 23/00 356/3.01 |
| 8,655,070 | B1* | 2/2014 | Yang | G06K 9/00657 382/100 |
| 8,737,720 | B2 | 5/2014 | Mas et al. | |
| 9,041,711 | B1* | 5/2015 | Hsu | G06T 17/20 345/420 |
| 9,367,743 | B1* | 6/2016 | Haglund | G06K 9/0063 |
| 2005/0271264 | A1* | 12/2005 | Ito | G06T 5/006 382/154 |
| 2005/0276443 | A1 | 12/2005 | Slamani et al. | |
| 2007/0025595 | A1* | 2/2007 | Koizumi | G01C 11/06 382/103 |
| 2008/0298638 | A1 | 12/2008 | Miyazaki et al. | |
| 2009/0067725 | A1* | 3/2009 | Sasakawa | G01C 11/04 382/190 |
| 2009/0087029 | A1* | 4/2009 | Coleman | G06K 9/00208 382/103 |
| 2009/0210205 | A1* | 8/2009 | Sullivan | G06K 9/00657 703/6 |
| 2010/0118053 | A1* | 5/2010 | Karp | G01C 11/06 345/630 |
| 2010/0246971 | A1* | 9/2010 | Ohtsubo | G06T 7/254 382/195 |
| 2011/0282578 | A1* | 11/2011 | Miksa | G01C 11/04 701/532 |
| 2013/0222369 | A1* | 8/2013 | Huston | G06T 17/00 345/419 |
| 2014/0300736 | A1* | 10/2014 | Reitinger | G06T 7/80 348/144 |
| 2014/0354635 | A1* | 12/2014 | Nascetti | G01C 11/06 345/420 |
| 2014/0362082 | A1* | 12/2014 | Schpok | G06T 17/05 345/427 |
| 2015/0294168 | A1* | 10/2015 | Artan | G06K 9/00838 382/104 |
| 2016/0063516 | A1* | 3/2016 | Terrazas | G06Q 30/0201 705/7.29 |
| 2017/0076438 | A1* | 3/2017 | Kottenstette | G06K 9/00637 |
| 2017/0124745 | A1* | 5/2017 | Christ | G01C 11/04 |
| 2017/0147890 | A1* | 5/2017 | Sano | G06T 11/60 |
| 2017/0222903 | A1* | 8/2017 | Karlsson | H04W 4/023 |
| 2017/0223592 | A1* | 8/2017 | Karlsson | H04W 48/04 |
| 2017/0317939 | A1* | 11/2017 | Karlsson | H04L 47/24 |
| 2018/0025231 | A1* | 1/2018 | Noh | G06K 9/00718 382/160 |
| 2018/0107900 | A1* | 4/2018 | Takahashi | G06K 9/6256 |

OTHER PUBLICATIONS

Hua-Mei Chen et al., "Imaging for Concealed Weapon Detection," IEEE Signal Processing Magazine, pp. 52-61, Mar. 2005.

Mohammad Haghighat et al., "CloudID: Trustworthy cloud-based and cross-enterprise biometric identification," Expert Sys. w/ Applications, vol. 42, No. 21, pp. 7905-7916, 2015.

Shaparas Daliman et al., "Oil Palm Tree Enumeration Based on Template Matching," WVCASEA2015, Mar. 2015 (6 pages).

Mansur Muhammad Aliero et al., "The Usefulness of Unmanned Airborne Vehicle (UAV) Imagery for Automated Palm Oil Tree Counting," Journal of Forestry, vol. 1, pp. 1-12, Dec. 2014.

Helmi Z. M. Shafri et al., "Semi-automatic detection and counting of oil palm trees from high spatial resolution airborne imagery," Int'l J. of R. Sens., pp. 2095-2115, Apr. 2011.

Panu Srestasathiern et al., "Oil Palm Tree Detection with High Resolution Multi-Spectral Satellite Imagery," Int'l J. of R. Sens., pp. 9749-9774, Oct. 2014.

Teja KA Ttenborn et al., "Automatic Single Palm Tree Detection in Plantations using UAV-based Photogrammetric Point Clouds," ISPRS Tech. Comm. III Symp., pp. 139-144, Sep. 2014.

* cited by examiner (a)

(b)

(a)

(b)

(a) Two Palm Trees (b) Three Palm Trees

METHODS AND SYSTEMS FOR AUTOMATIC OBJECT DETECTION FROM AERIAL IMAGERY

CROSS REFERENCE TO RELATED APPLICATION

The present disclosure is a continuation-in-part of U.S. application Ser. No. 15/367,975, filed on Dec. 2, 2016, which is expressly incorporated herein by reference in its entirety.

TECHNICAL FIELD

The present disclosure generally relates to methods and systems for detecting objects from aerial imagery, and more particularly, to methods and systems for detecting objects from an aerial image of an area of interest by template matching and artificial intelligence.

BACKGROUND

Automatic object detection is helpful to find and identify target objects in an image. Humans may be able to recognize one or a few target objects in an image with little effort. However, it can be challenging for humans to find and identify a substantial number of target objects in an image. Target objects in images may look different from different viewpoints when displayed in different sizes and scales, or even in different rotated angles. Some computer-implemented methods may detect target objects based on their appearance or features. However, the accuracy of those object detection methods might be not good enough for some applications, such as cash crops or certain agricultural applications.

Object detection from aerial imagery becomes even more challenging when the number of potential target objects in the area of interest increases and the resolution of aerial images is limited. Relying on humans to find and identify target objects becomes infeasible when there are considerable amounts of potential target objects in large-scale areas. Increasing the resolution of aerial images may be helpful in increasing the accuracy of object detection. However, at the same time, performing object recognition and detection on a high-resolution image increases the computing complexity, which would constrain the feasibility and efficiency of certain applications.

Therefore, methods and systems are needed to quickly and precisely detect target objects from aerial imagery of an area of interest. The disclosed methods and systems are directed to overcoming or improving one or more of the problems set forth above and/or other problems in the prior art.

SUMMARY

One aspect of the present disclosure is directed to a system for detecting objects from aerial imagery. The system comprises memory for storing instructions and at least one processor configured to execute the instructions to: obtaining an image of an area, obtaining a plurality of regional aerial images from the image of the area, classifying the plurality of regional aerial images as a first class or a second class by a classifier, wherein: the first class indicates a regional aerial image contains a target object, the second class indicates a regional aerial image does not contain a target object, and the classifier is trained by first and second training data, wherein the first training data include first training images containing target objects, and the second training data include second training images containing target objects obtained by adjusting at least one of brightness, contrast, color saturation, resolution, or a rotation angle of the first training images, and recognizing a target object in a regional aerial image in the first class.

Another aspect of the present disclosure is directed to a method for detecting objects from aerial imagery. The method comprises obtaining an image of an area, obtaining a plurality of regional aerial images from the image of the area, classifying the plurality of regional aerial images as a first class or a second class by a classifier, wherein: the first class indicates a regional aerial image contains a target object, the second class indicates a regional aerial image does not contain a target object, and the classifier is trained by first and second training data, wherein the first training data include first training images containing target objects, and the second training data include second training images containing target objects obtained by adjusting at least one of brightness, contrast, color saturation, resolution, or a rotation angle of the first training images, and recognizing a target object in a regional aerial image in the first class.

Yet another aspect of the present disclosure is directed to a non-transitory computer-readable medium storing instructions which, when executed, cause one or more processors to perform operations for detecting objects from aerial imagery. The operations comprise obtaining an image of an area, obtaining a plurality of regional aerial images from the image of the area, classifying the plurality of regional aerial images as a first class or a second class by a classifier, wherein: the first class indicates a regional aerial image contains a target object, the second class indicates a regional aerial image does not contain a target object, and the classifier is trained by first and second training data, wherein the first training data include first training images containing target objects, and the second training data include second training images containing target objects obtained by adjusting at least one of brightness, contrast, color saturation, resolution, or a rotation angle of the first training images; and recognizing a target object in a regional aerial image in the first class.

The foregoing generally describes just a few exemplary aspects of the present disclosure. It is to be understood that both the foregoing general description and the following detailed description are exemplary and explanatory only, and are not restrictive of the invention, as claimed.

DETAILED DESCRIPTION

This disclosure is generally directed to methods and systems for detecting objects from aerial imagery. It is contemplated that a target object may be a plant, a tree, an oil palm tree, an object, a building, a facility, a land, a geomorphological feature, or any combination thereof. In general, target objects to be detected may include anything, such as objects, buildings, facilities, plants, trees, animals, and even humans. Target objects may have several features in color, shape, and/or appearance. These features of target objects may be utilized to detect target objects in an image of an area of interest.

Figure 1:
FIG. 1 is an illustration of an exemplary aerial image of an area for automatic object detection, according to a disclosed embodiment.

FIG. 1 is an illustration of an exemplary aerial image of an area for automatic object detection, according to a disclosed embodiment. The oil palm trees, for example, are the exemplary target objects to be detected in the aerial image of the area. These oil palm trees have certain heights from the ground. In some embodiments, the disclosed methods and systems may include detecting target objects based on height information of target objects in the aerial image of the area. For example, a DSM of an area may include the earth's surface and all objects, and the height information associated with the earth surface and all objects. It is contemplated that the disclosed methods and systems may include detecting target objects through the height information contained in a DSM of an area of interest. In some embodiments, the disclosed methods and systems may include detecting target objects in various models and/or images of an area containing height information, such as Digital Elevation Model (DEM) of an area.

In some embodiments, the disclosed methods and systems may include obtaining DSMs, DEMs, and/or aerial images of an area by using one or more Light Detection And Ranging (LiDAR) sensors, real-time DSM sensors, sensors for post-producing DSM, calculations from a plurality of aerial images of the area, or any combination thereof. In some embodiments, the disclosed methods and systems may include collecting the DSM, DEMs, and/or aerial images of an area by using one of the aforementioned sensors and/or a camera by an Unmanned Aerial Vehicle (UAV) 100 (shown in FIG. 13), a drone, an aircraft, a helicopter, a balloon, or a satellite. In some embodiments, the disclosed methods and systems may further include receiving relevant data of DSMs, DEMs, and/or aerial images of an area from UAV 100, a drone, an aircraft, a helicopter, a balloon, or a satellite through a wireless connection, such as Bluetooth, Wi-Fi, cellular (e.g., GPRS, WCDMA, HSPA, LTE, or later generations of cellular communication systems), and satellite connection, or a wired connection, such as a USB line or a Lighting line.

In some embodiments, the disclosed methods and systems may include obtaining the DSMs, DEMs, and/or aerial images of an area for object detection from a plurality of DSMs, DEMs, and/or aerial images of parts of the area. For example, the disclosed methods and systems may include combining or stitching a plurality of aerial images of parts of the area to obtain the aerial images of the area in FIG. 1 for object detection. The disclosed methods and systems may include determining the appropriate mathematical model relating pixel coordinates in one image to pixel coordinates in another for image alignment. The disclosed methods and systems may further include estimating correct alignments relating various pairs of aerial images by combining direct pixel-to-pixel comparisons with gradient descent. The disclosed methods and systems may further include identifying and matching distinctive features in aerial images of parts of the area to establish correspondences between pairs of aerial images. The disclosed methods and systems may further include deciding a final compositing surface onto which to warp or projectively transform and place all of the aligned aerial images. The disclosed methods and systems may further include seamlessly blending the overlapping aerial images, even in the presence of parallax, lens distortion, scene motion, and exposure differences.

Figure 2:
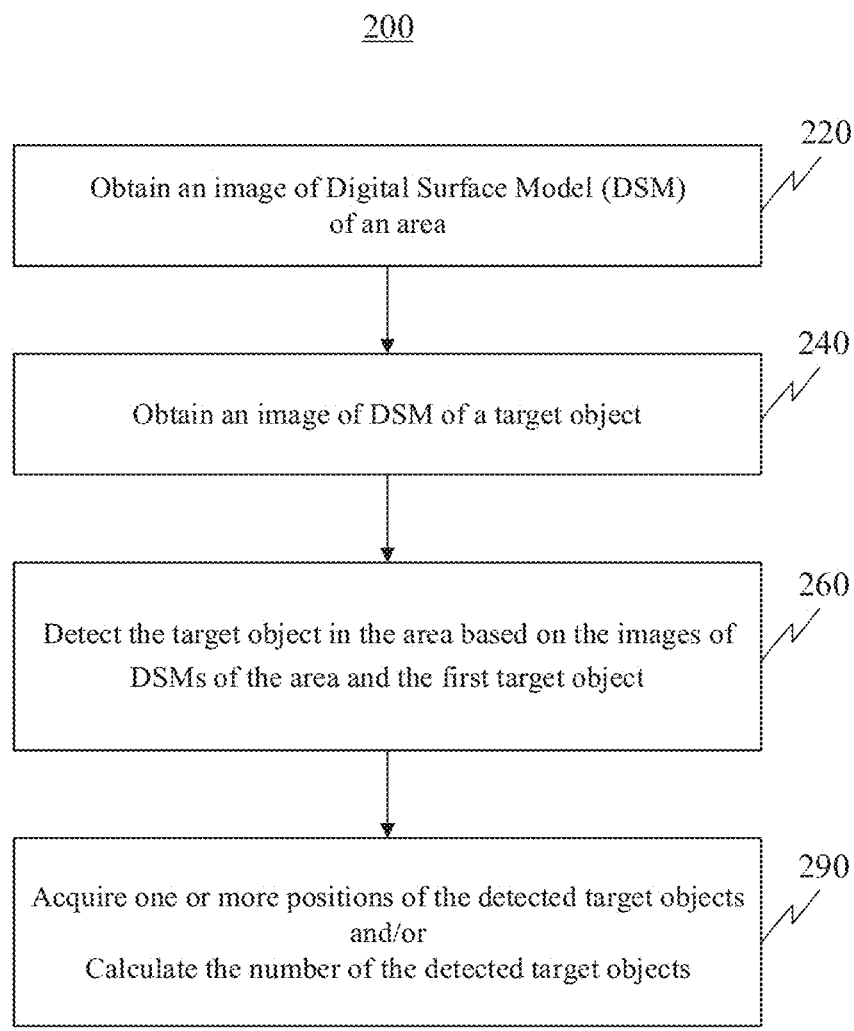
FIG. 2 is a flow chart illustrating an exemplary method for automatic object detection from aerial imagery, according to a disclosed embodiment.

FIG. 2 is a flow chart illustrating an exemplary method 200 for automatic object detection from aerial imagery, according to a disclosed embodiment. One aspect of the present disclosure is directed to a non-transitory computer-readable medium storing instructions which, when executed, cause one or more processors to perform the exemplary method 200 in FIG. 2 for detecting objects from aerial imagery. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon. In some embodiments, the computer-readable medium may be a cloud or a remote storage having the computer instructions stored thereon, which instructions may be downloaded to another device for the execution.

Method 200 may include the steps of obtaining a DSM image of an area (step 220), obtaining a DSM image of a target object (step 240), and detecting the target object in the area based on the DSM images of the area and the target object in steps 220 and 240 (step 260). It should be noted that a DSM of an area contains height information of the area. A DSM image of the area may be obtained by using the height information of the area as the grayscale values of the grayscale image of the area, and vice versa. Accordingly, a "DSM" and a "DSM image" may be alternatively used if applicable throughout the whole present disclosure.

Step 220 may include obtaining a DSM image of an area of interest. For example, obtaining a DSM image of an area of step 220 may include accessing a DSM image of an area of interest from a computer-readable medium or computer-readable storage device. For another example, obtaining a DSM image of an area of step 220 may include receiving a DSM image of an area of interest from an external input, such as image input 120 (which will be described in the disclosed systems). Image input 120 may be communicatively connected to, for example, UAV 100, a drone, an aircraft, a helicopter, a balloon, or a satellite. In other words, obtaining a DSM image of an area of step 220 may include receiving the DSM image of an area of interest from UAV 100, a drone, an aircraft, a helicopter, a balloon, or a satellite. In some embodiments, obtaining a DSM image of an area of step 220 may include obtaining a plurality of DSM images of parts of the area, and combining or stitching the plurality of DSM images of parts of the area to obtain the DSM image of the area of interest. For example, obtaining a DSM image of an area of step 220 may include obtaining a plurality of DSM images of parts of the area, and identifying and matching distinctive features in the plurality of DSM images of parts of the area to establish correspondences between pairs of DSM images. Obtaining a DSM image of an area of step 220 may further include blending the plurality of DSM images of parts of the area based on the established correspondences between the pairs of DSM images to obtain the DSM image of the area of interest.

Figure 3:
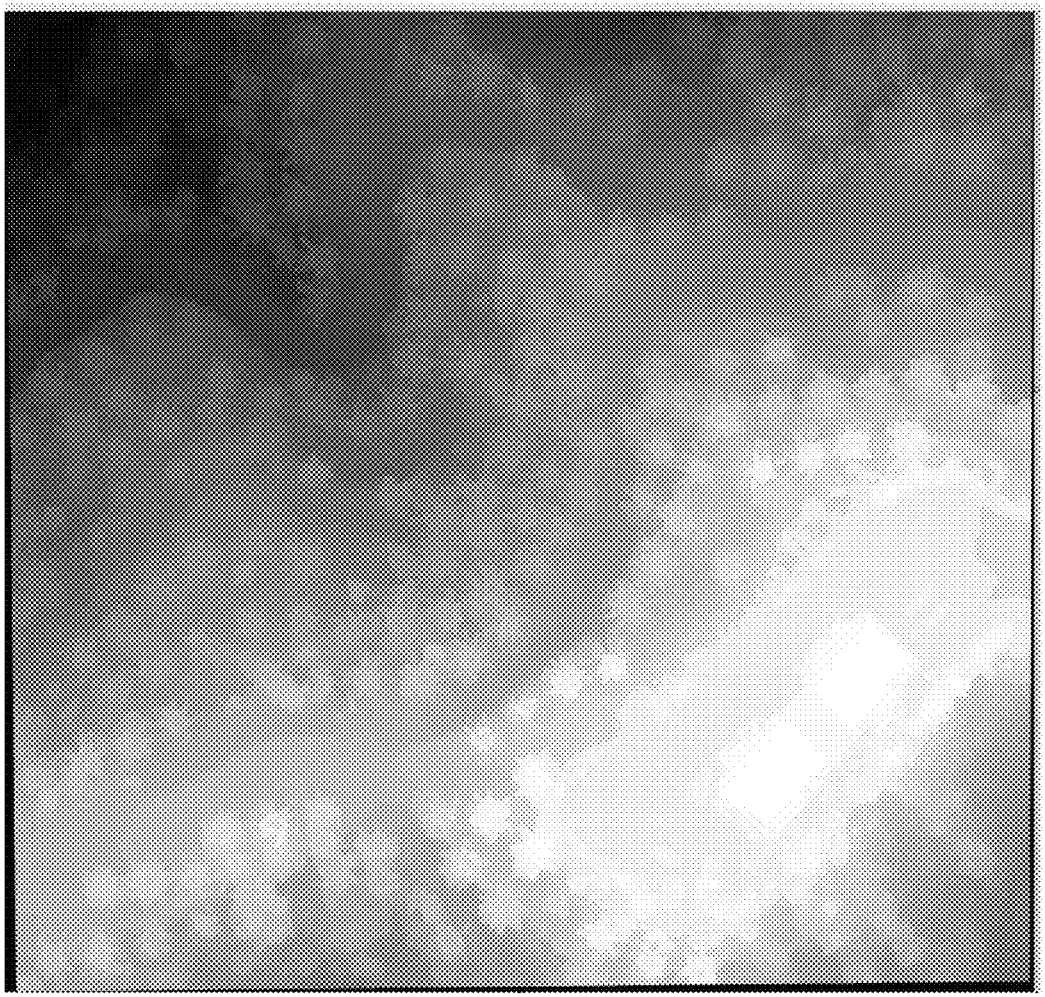
FIG. 3 is an illustration of an exemplary DSM image of the area, corresponding to the exemplary aerial image of the area in FIG. 1, for automatic object detection, according to a disclosed embodiment.

In some embodiments, obtaining a DSM image of an area of step 220 may include obtaining a plurality of aerial images of an area, combining or stitching these aerial images of parts of the area to obtain an aerial image of the area, and transferring the stitched aerial image of the area into a DSM image of the area. For example, obtaining a DSM image of an area of step 220 may include receiving a plurality of aerial images of parts of an area, and stitching the plurality of aerial images of parts of the area to obtain the aerial image of the area as shown in FIG. 1. Those aerial images of parts of the area may be associated with a plurality of DSMs of parts of the area. In other words, the plurality of aerial images of parts of the area may be corresponded to a plurality of DSMs of parts of the area. Step 220 may include obtaining a DSM image of the area in FIG. 3 corresponding to the stitched aerial images of the area in FIG. 1 based on the correspondence between the aerial images and the DSMs of the parts of the area. FIG. 3 is an illustration of an exemplary DSM image of the area, corresponding to the exemplary aerial image of the area in FIG. 1, for automatic object detection, according to a disclosed embodiment.

In some embodiments, obtaining the DSM image of the area of step 220 may include collecting DSMs and/or aerial images of the area or parts of the area by using one or more LiDAR sensors, real-time DSM sensors, sensors for post-producing DSM, calculations from a plurality of aerial images of the area, or any combination thereof. In some embodiments, obtaining the DSM image of the area of step 220 may include collecting DSMs and/or aerial images of an area or parts of the area by using one of the aforementioned sensors and/or a camera through UAV 100, a drone, an aircraft, a helicopter, a balloon, or a satellite. In some embodiments, obtaining the DSM image of the area of step 220 may further include receiving collected data of DSMs and/or aerial images of the area from UAV 100, a drone, an aircraft, a helicopter, a balloon, or a satellite through a wireless connection, such as Bluetooth, Wi-Fi, cellular (e.g., GPRS, WCDMA, HSPA, LTE, or later generations of cellular communication systems), and satellite connection, or a wired connection, such as a USB line or a Lighting line.

In some embodiments, obtaining a DSM image of an area of step 220 may further include obtaining a color aerial image of the area corresponding to the DSM image of the area, obtaining a color aerial image of a target object, identifying one or more subareas of the area as one or more target subareas based on the color aerial image of the area and the color of the target object.

For example, obtaining a DSM image of an area of step 220 may further include obtaining the RGB aerial image of the area in FIG. 1 corresponding to the DSM image of the area of interest in FIG. 3. In addition, obtaining a DSM image of an area of step 220 may further include obtaining an RGB aerial image of an oil palm tree, the target object. Moreover, obtaining a DSM image of an area of step 220 may further include identifying the color green as a specific primary color of the oil palm tree. Furthermore, obtaining a DSM image of an area of step 220 may further include identifying those pixels of the aerial image of the area as possible pixels of oil palm trees when their individual G values are larger than their both individual R and B values. For example, the following conditional operations may be used to check whether a pixel is identified as possible pixels of oil palm trees: If (Pixel.G>Pixel.R && Pixel.G>Pixel.B) Get Pixel, where Pixel.R, Pixel.G, and Pixel.B stands for the individual R, G, and B levels of the pixel. Furthermore, obtaining a DSM image of an area of step 220 may further include identifying a certain amount of adjacent possible pixels of the oil palm trees as a target subarea.

In some embodiments, obtaining a DSM image of an area of step 220 may further include identifying a specific primary color of the target object. For example, identifying a specific primary color of the target object of step 220 may include comparing individual R, G, and B levels within pixels of the aerial image of the target object, and determining representative primary colors of these pixels. In addition, identifying a specific primary color of the target object of step 220 may further include calculating the numbers of representative primary colors of these pixels, and identifying the representative primary color of the maximum number of pixels as the specific primary color of the target object. For example, identifying a specific primary color of the target object of step 220 may include identifying the color green as the specific primary color of the oil palm tree when the color green is the representative primary color with the maximum number of the pixels of the aerial image of the oil palm tree.

In some embodiments, obtaining a DSM image of an area of step 220 may further include enhancing the contrast of the images of the one or more target subareas on the DSM image of the area. For example, enhancing the contrast of the target subareas of step 220 may include enhancing the contrast of the target subareas of the DSM image of the area corresponding to the identified target subareas of the aerial image of the area by histogram equalization. By using histogram equalization, for example, enhancing the contrast of step 220 may include calculating the probability mass function of the pixels of the target subareas, calculating cumulative distributive function (CDF) values according to gray levels, multiplying the CDF values with the (Gray levels—1), and mapping the new gray level values into the pixels of the target subareas. Enhancing the contrast of step 220 may include enhancing the contrast by other algorithms, such as global stretching, anisotropic diffusion, non-linear pyramidal techniques, multi-scale morphological techniques, multi-resolution splines, mountain clustering, retinex theory, wavelet transformations, curvelet transformations, k-sigma clipping, fuzzy logic, genetic algorithms, or greedy algorithms.

Figure 4:
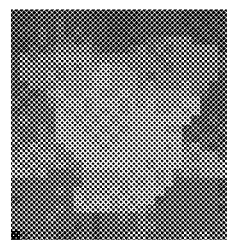
FIG. 4 is an illustration of two exemplary DSM images of an exemplary kind of target objects for automatic object detection, according to a disclosed embodiment.
Figure 4:
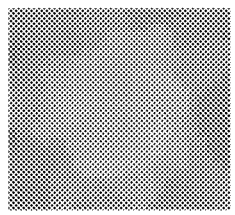

Step 240 may include obtaining a DSM image of a target object. FIG. 4 is an illustration of two exemplary DSM images of an exemplary kind of target objects for automatic object detection, according to a disclosed embodiment. For example, obtaining a DSM image of a target object of step 240 may include accessing the DSM image of the oil palm tree in FIG. 4(*a*) from a computer-readable medium or computer-readable storage device. For another example, obtaining a DSM image of a target object of step 240 may include receiving the DSM image of the oil palm tree in FIG. 4(*a*) from an external input, such as image input 120 (will be described in the disclosed systems). For another example, obtaining a DSM image of a target object of step 240 may include receiving a selection signal from an internal input, such as image input 120. The selection signal may include identifying a part of the DSM image of the area in step 220 as a DSM image of a target object. For example, the selection signal may include identifying a region, surrounding a DSM image of an oil palm tree, on the DSM image of the area as the target object while a user uses a mouse cursor, his/her finger, or a pen to select the region on a display screen.

In some embodiments, obtaining a DSM image of a target object of step 240 may include accessing or receiving a plurality of DSM images of target objects, and selecting one of them as a DSM image of a target object. Selecting the DSM image of the target object of step 240 may include selecting the DSM image of the target object based on the shape of the target object. For example, selecting the DSM image of the target object of step 240 may include selecting the DSM image of the target object whose shape may be similar to most of the same kind of target objects. In some embodiments, selecting the DSM image of the target object of step 240 may include selecting the DSM image of a target object based on the contrast of the DSM image of the target object. For example, selecting the DSM image of the target object of step 240 may include selecting the DSM image of the target object whose contrast may be better than others. In some embodiments, obtaining the DSM image of the target object of step 240 may include obtaining more than one DSM image of the target object. For example, obtaining the DSM image of the target object of step 240 may include obtaining two DSM images of the target objects based on the shape of the target object and the contrast of the DSM image of the target object respectively.

In some embodiments, obtaining the DSM image of the target object of step 240 may include collecting one or more DSMs and/or aerial images of target objects by using one or more LiDAR sensors, real-time DSM sensors, sensors for post-producing DSM, calculations from a plurality of aerial images of the area, or any combination thereof. In some embodiments, obtaining the DSM image of the target object of step 240 may further include collecting one or more DSMs and/or aerial images of target objects using one of the aforementioned sensors and/or a camera by UAV 100, a drone, an aircraft, a helicopter, a balloon, or a satellite. In some embodiments, obtaining the DSM image of the target object of step 240 may include receiving DSMs and/or aerial images of the target objects from UAV 100, a drone, an aircraft, a helicopter, a balloon, or a satellite through a wireless connection, such as Bluetooth, Wi-Fi, cellular (e.g., GPRS, WCDMA, HSPA, LTE, or later generations of cellular communication systems), and satellite connection, or a wired connection, such as a USB line or a Lighting line.

In some embodiments, obtaining the DSM image of the target object of step 240 may include obtaining one or more aerial images of target objects corresponding to one or more DSM images of target objects, and selecting one or more DSM images of target objects based on the shape of the target object and/or the contrast of the aerial image of the target object.

Step 260 may include detecting the target object in the area based on the DSM images of the area and the target object in steps 220 and 240. In some embodiments, detecting the target object of step 260 may include calculating match rates between the DSM image of the target object and a plurality of DSM sub-images of the area, and determining one or more DSM sub-images of the area as the target objects based on the match rates. For example, detecting the target object of step 260 may include calculating match rates between the DSM image of an oil palm tree in FIG. 4(*a*) and a plurality of DSM sub-images of the area from the DSM image of the area in FIG. 3. The plurality of DSM sub-images of the area may have the same or similar size as the DSM image of the oil palm tree. For example, the sizes of the plurality of DSM sub-images of the area may be 300× 300 pixels while the DSM image of the oil palm tree in FIG. 4(*a*) may be 300×300 pixels or a similar size. For example, the plurality of DSM sub-images of the area may include sub-images of 300×300 pixels on every 1, 2, 5, or 10 pixels of the DSM image of the area. In other words, detecting the target object of step 260 may include comparing the template DSM image of the oil palm tree (T) against the DSM image of the area (I) by sliding through its each 1, 2, 5, or 10 pixels. For example, for each position (x,y) of the sliding on the DSM image of the area, the match rate R may be calculated as:

$$R(x, y) = \frac{\sum_{x',y'} (T'(x', y') \cdot I'(x+x', y+y'))}{\sqrt{\sum_{x',y'} T'(x', y')^2 \cdot \sum_{x',y'} I'(x+x', y-y')^2}}$$

where x' and y' refer to pixel positions within the template DSM image of the oil palm tree (T') and the DSM sub-images of the area (I').

Figure 5:
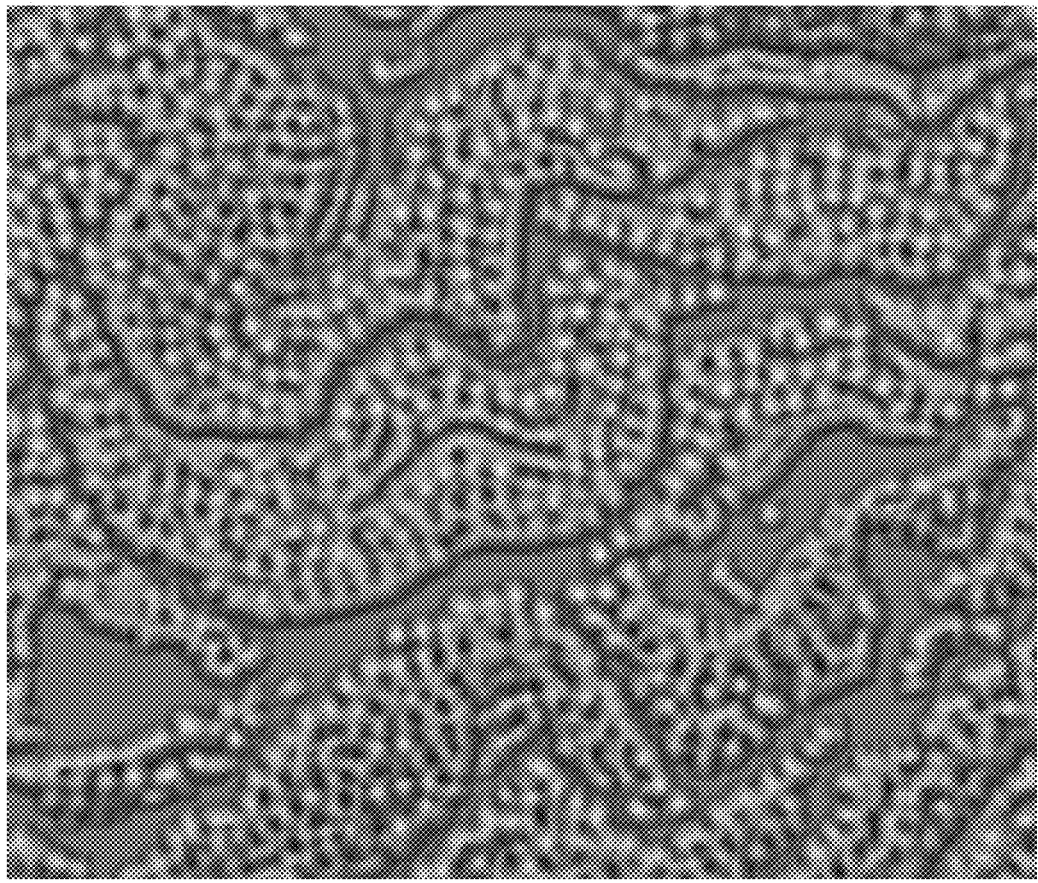
FIG. 5 is an illustration of an exemplary image of matching rates from exemplary calculations of match rates between the exemplary DSM image of the area in FIG. 3 and the exemplary template image in FIG. 4 for automatic object detection, according to a disclosed embodiment.

FIG. 5 is an illustration of an exemplary image of matching rates from exemplary calculations of match rates between the exemplary DSM image of the area in FIG. 3 and the exemplary template image in FIG. 4 for automatic object detection, according to a disclosed embodiment. In FIG. 5, the brighter a position is, the higher the possibility the position is a target object. For example, the bright points on the image of match rates in FIG. 5 may be positions of oil palm trees in the area of interest.

In some embodiments, calculating match rates of step 260 may include calculating match rates according to conventional template match methods, such as a squared difference method, a normalized squared difference method, a cross-correlation method, a normalized cross-correlation method, a correlation coefficient method, a normalized correlation coefficient method, or any combination thereof.

In some embodiments, determining DSM sub-images of the area as the target objects of step 260 may include determining one or more DSM sub-images of the area as the oil palm trees when their match rates Rs with the template image of the target object are higher than a match threshold, such as 80%, 70%, or 60% of the self-match rate of the template DSM image of the oil palm tree (T).

In some embodiments, detecting the target object of step 260 may include reducing the resolutions of the DSM images of the area and the target object in steps 220 and 240, and detecting the target object in the area based on the resolution-reduced DSM images of the area and the target object. For example, detecting the target object of step 260 may include reducing the resolutions of the DSM images of the area in FIG. 3 and the oil palm tree in FIGS. 4(*a*) to 0.1 times of the original resolutions. Detecting the target object of step 260 may further include calculating match rates between the resolution-reduced DSM image of the oil palm tree and a plurality of resolution-reduced DSM sub-images of the area, and determining one or more DSM sub-images of the area as the target object based on the match rates.

In some embodiments, detecting the target object of step 260 may include detecting the target object in the area based on the image of DSMs of the area in step 220 and more than one image of target objects in step 240. For example, detecting the target object of step 260 may include calculating match rates between the two DSM images of the oil palm trees in FIGS. 4(*a*) and 4(*b*) and a plurality of DSM sub-images of the area respectively, and determining one or more DSM sub-images of the area as the oil palm trees based on the match rates from the two DSM images of the oil palm trees. For example, detecting the target object of step 260 may include calculating match rates between a DSM image of an oil palm tree selected based on the shape of the target object in step 240 and a plurality of DSM sub-images of the area. Detecting the target object of step 260 may also include calculating match rates between another DSM image of an oil palm tree selected based on the contrast of the image in step 240 and a plurality of DSM sub-images of the area. Detecting the target object of step 260 may further include determining one or more DSM sub-images of the area as the oil palm tree when their match rates, from the template DSM image of an oil palm tree selected based on either the shape of the target object or the contrast of the image, are higher than a match threshold. For another example, determining the oil palm trees of step 260 may include determining one or more DSM sub-images of the area as the oil palm trees when both their match rates, from the template DSM images of an oil palm tree selected based on the shape of the oil palm tree and the contrast of the image of the oil palm tree, are higher than a match threshold.

In some embodiments, determining DSM sub-images of the area as the target objects of step 260 may include determining the target objects based on one or both of the following two criteria. The match rates of the one or more DSM sub-images of the area are the maximum within a distance ($D_1$) on the aerial image of the area. The heights of the one or more DSM sub-images of the area are higher than the height of the lowest position within another distance ($D_2$) by a height threshold ($H_1$). For example, determining the oil palm trees of step 260 may include determining one or more DSM sub-images of the area as the oil palm tree when their match rates are higher than the others within 2 meters (i.e. $D_1$=2 meters), an exemplary radius of an aerial image of an oil palm tree. For another example, determining the oil palm trees of step 260 may include determining one or more DSM sub-images of the area as the oil palm tree when their heights are higher than the height of the lowest position within 3 meters (i.e. $D_2$=3 meters), an exemplary radius of an individual area where an oil palm tree and the land may both exist, by an exemplary height threshold of 2.5 meters (i.e. $H_1$=2.5 meters). An oil palm tree higher than 2.5 meters from the ground may be detected according to the aforementioned $D_1$, $D_2$, and $H_1$ parameters. These factors may be adjustable for various target objects according to their heights and distribution.

In some embodiments, step 260 may include detecting the target object in the area based on the enhanced DSM image of the area in step 220 and the DSM image of the target object. For example, detecting the target object of step 260 may include detecting the oil palm tree in the area based on one or two DSM images of the oil palm trees in FIG. 4 and the contrast-enhanced DSM image of the area, whose target subareas may have been identified and enhanced the contrast in step 220.

Figure 6:
FIG. 6 is an illustration of the exemplary aerial image of the area marked with the positions of the detected exemplary target objects in accordance with the exemplary method for automatic object detection in FIG. 2, according to a disclosed embodiment.

In some embodiments, method 200 may further include acquiring one or more positions of the target objects detected in step 260. For example, acquiring positions of the target objects may include acquiring the positions of the oil palm trees detected on the DSM image of the area in FIG. 3. For another example, acquiring positions of the target objects of step 290 may include acquiring the positions of the oil palm trees detected on the aerial images of the area based on the correspondence between the DSM image of the area and the aerial image of the area. FIG. 6 is an illustration of the exemplary aerial image of the area marked with the positions of the exemplary target objects detected in accordance with the exemplary method for automatic object detection in FIG. 2, according to a disclosed embodiment. In FIG. 6, the detected oil palm trees are marked by red circles in the aerial image of the area.

In some embodiments, step 290 may further include displaying the positions of the detected target objects on the aerial image of the area or a map. For example, displaying the detected target objects of step 290 may include displaying the positions of the one or more detected oil palm trees on the aerial image of the area as the red circles shown in FIG. 6. For another example, displaying the detected target objects of step 290 may include displaying the positions of the one or more detected oil palm trees on a map of the area based on the association or correspondence between the positions on the DSM image of the area and the map of the area (not shown). For example, a position on the DSM image of the area may be associated with a set of longitude, latitude, and elevation. Step 290 may include obtaining the detected oil palm trees' sets of longitudes, latitudes, and elevations, and displaying the detected oil palm trees on a map based on the sets of longitudes, latitudes, and/or elevations. For example, displaying the detected oil palm trees of step 290 may include displaying the detected oil palm trees on a geographic information system (GIS) map based on the sets of longitudes and latitudes. For another example, displaying the detected oil palm trees of step 290 may include displaying the detected oil palm trees on a map based on the sets of longitudes, latitudes, and elevations, for example a 3D GIS map.

In some embodiments, step 290 may further include calculating the number of the detected target objects. For example, calculating the detected target objects of step 290 may include calculating the detected oil palm trees shown in the FIG. 6.

Figure 7:
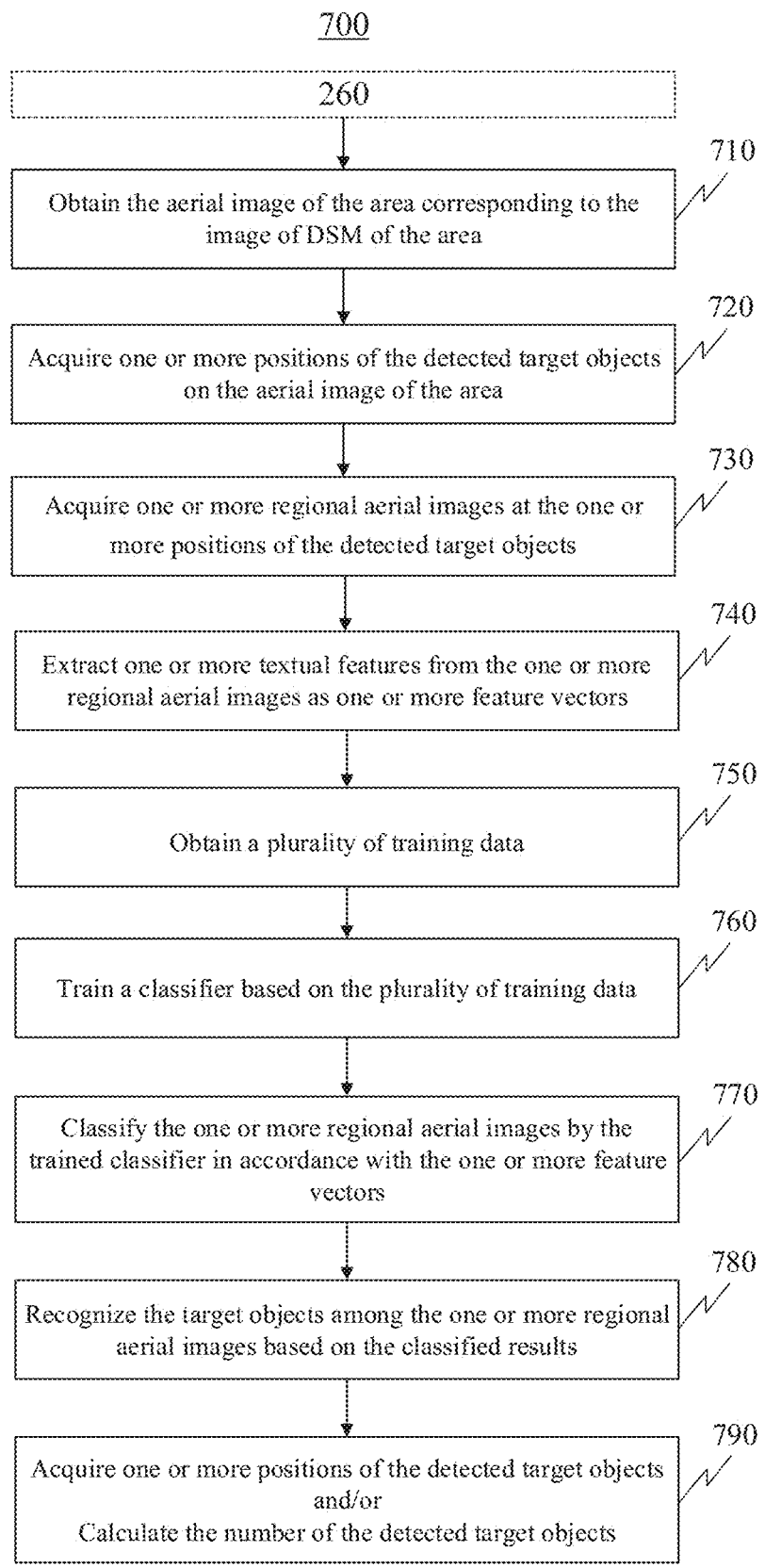
FIG. 7 is a flow chart illustrating another exemplary method for automatic object detection from aerial imagery, according to a disclosed embodiment.

FIG. 7 is a flow chart illustrating another exemplary method 700 for automatic object detection from aerial imagery, according to a disclosed embodiment. Method 700 may include steps 220, 240, and 260, and may further include obtaining the aerial image of the area corresponding to the DSM image of the area (step 710), acquiring one or more positions of the detected target objects on the aerial image of the area (step 720), acquiring one or more regional aerial images at the one or more positions of the detected target objects (step 730), extracting one or more textual features from the one or more regional aerial images as one or more feature vectors (step 740), obtaining a plurality of training data (step 750), training a classifier based on the plurality of training data (step 760), classifying the one or more regional aerial images by the trained classifier in accordance with the one or more feature vectors (step 770), and recognizing the target objects among the one or more regional aerial images based on the classified results (step 780). The training data may include a plurality of aerial images of the same kind of objects as the target objects.

Step 710 may include obtaining the aerial image of the area corresponding to the DSM image of the area in step 220. For example, step 710 may include obtaining the aerial image of the area of interest in FIG. 1 corresponding to the DSM image of the area of interest in FIG. 3. For example, obtaining the aerial image of the area of step 710 may include accessing the aerial image of the area of interest from a computer-readable medium or computer-readable storage device. For another example, obtaining the aerial image of the area of step 710 may include receiving the DSM image of the area from an external input, such as image input 120 (will be described in the disclosed systems). In some embodiments, obtaining the aerial image of the area of step 710 may include obtaining a plurality of aerial images of parts of the area, and stitching the plurality of aerial images of parts of the area to obtain the aerial image of the area. For example, obtaining the aerial image of the area of step 710 may include obtaining a plurality of aerial images of parts of the area in FIG. 1, and stitching the aerial images of parts of the area to obtain the aerial image of the area of interest.

In some embodiments, obtaining the aerial image of the area of step 710 may include obtaining the aerial image of the area in various color spaces. For example, obtaining the aerial image of the area of step 710 may include obtaining the aerial image of the area in color spaces including at least one of RGB, grayscale, HSI, L*a*b, multi-spectral space, or any combination thereof.

In some embodiments, obtaining the aerial image of the area of step 710 may include collecting aerial images of the area or parts of the area by using one or more LiDAR sensors, real-time DSM sensors, sensors for post-producing DSM, calculations from a plurality of aerial images of the area, or any combination thereof. In some embodiments, obtaining the aerial image of the area of step 710 may include collecting aerial images of an area or parts of the area using one of the aforementioned sensors and/or a camera by UAV 100, a drone, an aircraft, a helicopter, a balloon, or a satellite. In some embodiments, obtaining the aerial image of the area of step 710 may further include receiving collected data of aerial images of the area from UAV 100, a drone, an aircraft, a helicopter, a balloon, or a satellite through a wireless connection, such as Bluetooth, Wi-Fi, cellular (e.g., GPRS, WCDMA, HSPA, LTE, or later generations of cellular communication systems), and satellite connection, or a wired connection, such as a USB line or a Lighting line.

Step 720 may include acquiring one or more positions of the detected target objects in step 260 on the aerial image of the area. For example, acquiring the positions of the detected target object of step 720 may include acquiring the positions of the detected oil palm trees on the DSM image of the area in FIG. 3, and acquiring the positions of the detected oil palm trees on the aerial images of the area in FIG. 1 based on the correspondence between the DSM image of the area and the aerial image of the area. In other words, acquiring the positions of the detected target object of step 720 may include acquiring the positions of the red circles, the detected oil palm trees, in FIG. 6.

Figure 8:
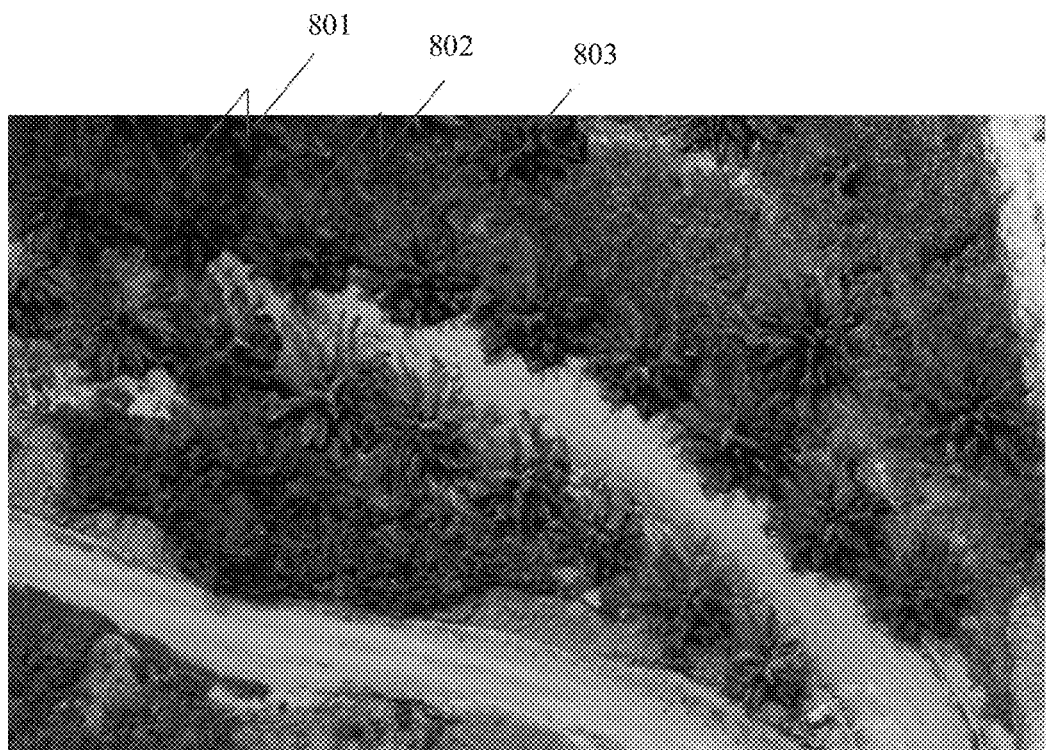
FIG. 8 is an illustration of a partial enlarged view of the exemplary aerial image of the area marked with the positions of the detected exemplary target objects in accordance with the exemplary method for automatic object detection in FIG. 2, according to a disclosed embodiment.

Step 730 may include acquiring one or more regional aerial images at the one or more positions of the detected target objects. FIG. 8 is an illustration of a partial enlarged view of the exemplary aerial image of the area marked with the positions of the detected exemplary target objects in accordance with the exemplary method for automatic object detection in FIG. 2, according to a disclosed embodiment. For example, acquiring the regional aerial images of step 730 may include acquiring 300×300 regional aerial images at detected oil palm trees 801, 802, 803 in FIG. 8 from the aerial image of the aerial in step 710 based on the position acquired in step 720. For example, acquiring the regional aerial images of step 730 may include acquiring the 300× 300 regional aerial images of detected oil palm trees by referring to detected positions in step 720 as the centers of the 300×300 regional aerial images. For another example, acquiring the regional aerial images of step 730 may include acquiring circular regional aerial images at detected oil palm trees by referring to detected positions in step 720 as the centers of the circles. The radius of the circular aerial image of the detected oil palm tree may include, for example, 150 pixels. The shape of the regional aerial images of the detected target objects may include other shapes such as rectangle, triangle, or other shapes similar to the shape of the target objects.

In some embodiments, acquiring the regional aerial images of step 730 may include creating one or more coordinates by using the positions of the detected target objects as origins, and acquiring one or more 300×300 regional aerial images around these origins. These coordinates may be used to refer to the acquired regional aerial images.

In some embodiments, acquiring the regional aerial images of step 730 may include acquiring one or more regional aerial images at the one or more positions of the detected target objects in various color spaces. For example, acquiring the regional aerial images of step 730 may include acquiring one or more 300×300 regional aerial images of the detected oil palm trees in color spaces such as RGB, grayscale, HSI, L*a*b, multi-spectral space, or any combination thereof. For example, acquiring the regional aerial images of step 730 may include acquiring these regional aerial images of the detected oil palm trees in the aforementioned color spaces from the aerial image of the area in the aforementioned color spaces in step 710. In some embodiments, acquiring the regional aerial images of step 730 may include acquiring one or more regional aerial images of the detected target objects in a color space, and transferring the one or more regional aerial images of the detected target objects in the color space to their counterparts in another color space. For example, acquiring the regional aerial images of step 730 may include acquiring one or more RGB regional aerial images of the detected oil palm trees, and transferring them to grayscale counterparts. For another example, acquiring the regional aerial images of step 730 may include acquiring one or more RGB regional aerial images of the detected oil palm trees, and transferring them to their counterparts in HSI.

Step 740 may include extracting one or more textual features from the one or more regional aerial images as one or more feature vectors of the detected target objects in step 260. For example, extracting the textual features of step 740 may include extracting the one or more textual features based on Gabor filter, Gray-Level Co-occurrence Matrix (GLCM), Local Binary Pattern (LBP), Histograms of Oriented Gradients (HOG), first-order feature description, second-order feature description, or any combination thereof. Extracting feature of step 740 may include extracting informative and non-redundant features of the regional aerial images by the aforementioned methods to facilitate subsequent classifications in step 770.

In some embodiments, extracting one or more textual features of step 740 may include extracting the one or more texture features from at least one of the one or more regional aerial images in one color space, and/or the one or more regional aerial images in another color space. For example, extracting one or more textual features of step 740 may include extracting the one or more textual features from the one or more regional aerial images of the detected oil palm trees in grayscale based on Multi-block Local Binary Patterns (MB-LBP). For another example, extracting one or more textual features of step 740 may include extracting the one or more textual features from the one or more regional aerial images of the detected oil palm trees in RGB based on Gabor filter. For another example, extracting one or more textual features of step 740 may include extracting the one or more textual features from the one or more regional aerial images of the detected oil palm trees in both grayscale and RGB based on Multi-block Local Binary Patterns (MB-LBP). For another example, extracting one or more textual features of step 740 may include extracting the one or more textual features from the one or more regional aerial images of the detected oil palm trees in grayscale based on GLCM, and extracting the one or more textual features from the one or more regional aerial images of the detected oil palm trees in L*a*b based on HOG.

Figure 9:
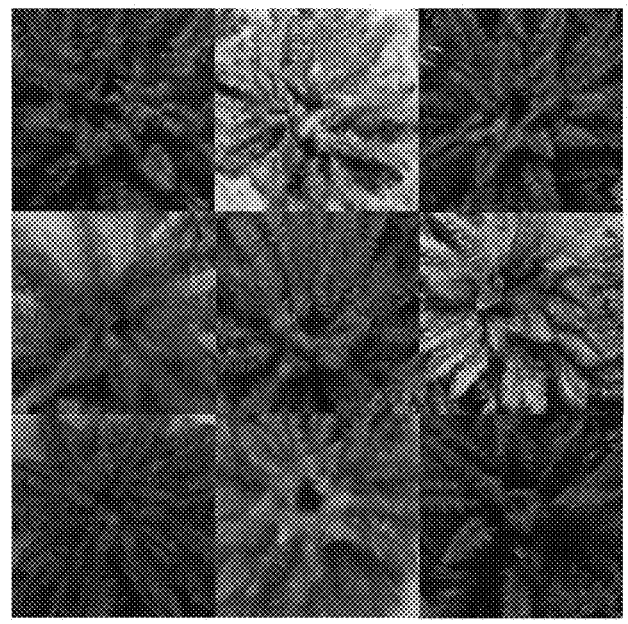
FIG. 9 is an illustration of a plurality of exemplary training data that may be utilized to train an exemplary classifier for automatic object detection, according to a disclosed embodiment.
Figure 9:
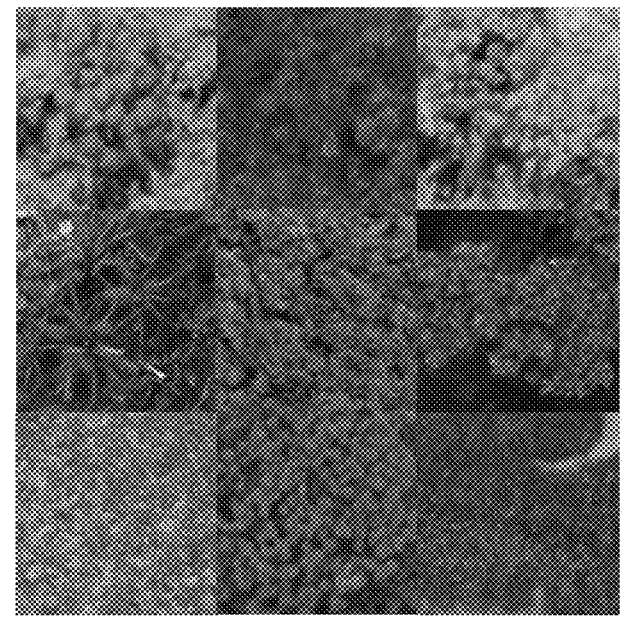

Step 750 may include obtaining a plurality of training data. The training data may include a plurality of aerial images of the same kind of objects as the target objects. FIG. 9 is an illustration of a plurality of exemplary training data that may be utilized to train an exemplary classifier for automatic object detection, according to a disclosed embodiment. For example, step 750 may include obtaining a plurality of aerial images of oil palm trees, shown in FIG. 9(*a*), as being the training data. In some embodiments, step 750 may further include obtaining a plurality of aerial images of non-target objects, shown in FIG. 9(*b*), as being a part of the training data. For example, obtaining the training data of step 750 may include accessing the training data from a computer-readable medium or computer-readable storage device. For another example, obtaining the training data of step 750 may include receiving the training data from an external input, such as image input 120 (will be described in the disclosed systems).

Step 760 may include training a classifier based on the plurality of training data in step 750. A classifier is a function that uses pattern matching to determine a closest match. It can be tuned according to training data. Training data may include observations or patterns. For example, in supervised learning, each pattern belongs to a certain predefined class. A class can be seen as a decision that has to be made. All the observations combined with their class labels are known as a data set. When a new observation is received, that observation is classified based on previous experience. For example, training the classifier of step 760 may include training at least one of a Support Vector Machine (SVM) classifier, an Artificial Neural Network (ANN) classifier, a Decision Tree classifier, a Bayes classifier, or any combination thereof by the training data of oil palm trees and non-target objects in FIG. 9. For another example, training the classifier of step 760 may include training at least one of a Support Vector Machine (SVM) classifier, an Artificial Neural Network (ANN) classifier, a Decision Tree classifier, a Bayes classifier, or any combination thereof by the training data of oil palm trees in FIG. 9(a) and non-target objects that are randomly generated.

Step 770 may include classifying the one or more regional aerial images in step 730 by the trained classifier in step 760 in accordance with the one or more feature vectors in step 740. For example, classifying the regional aerial images of step 770 may include classifying the one or more regional aerial images of the detected oil palm trees in step 730 by the trained SVM classifier in step 760 in accordance with the one or more feature vectors extracted by Gabor filter and GLCM in step 740. For another example, classifying the regional aerial images of step 770 may include classifying the one or more regional aerial images of the detected oil palm trees in step 730 by the trained ANN classifier in step 760 in accordance with the one or more feature vectors extracted by LBP and HOG in step 740. For another example, classifying the regional aerial images of step 770 may include classifying the one or more regional aerial images of the detected oil palm trees in step 730 by the trained ANN classifier in step 760 in accordance with the one or more feature vectors extracted by Gabor filter, GLCM, LBP, and HOG in step 740. Method 700 may include any combinations of the aforementioned textual extraction algorithms and the classifiers.

Figure 10:
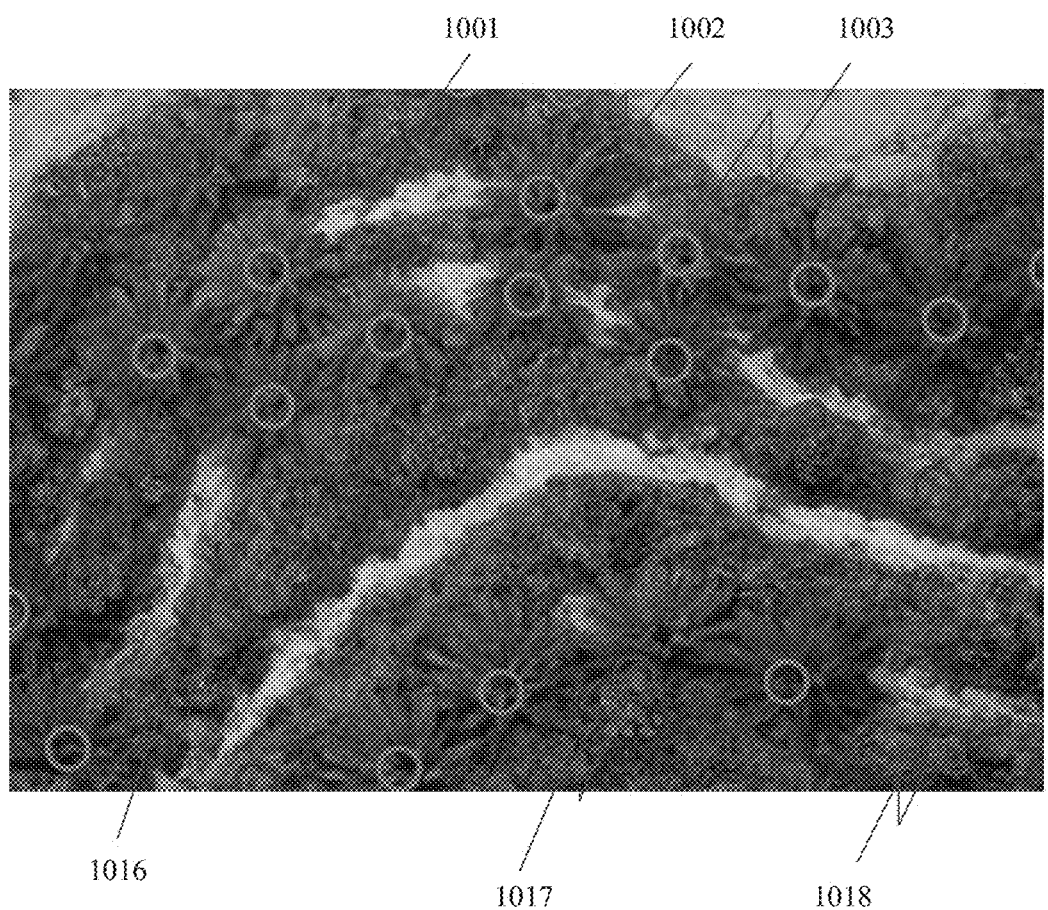
FIG. 10 is an illustration of a partial enlarged view of the exemplary aerial image of the area marked the classified results at the positions of detected target objects in accordance with the exemplary method for automatic object detection in FIG. 7, according to a disclosed embodiment.

The classification results by a classifier may include two kinds of results or multiple kinds of results. For example, an SVM classifier may output "0" when a regional aerial image of the detected oil palm tree is classified as the same kind of objects in FIG. 9(a) based on its feature vector. The SVM classifier may output "1" when a regional aerial image of the detected oil palm tree is classified as the same kind of objects in FIG. 9(b) based on its feature vector. FIG. 10 is an illustration of a partial enlarged view of the exemplary aerial image of the area marked the classified results at the positions of detected target objects in accordance with the exemplary method for automatic object detection in FIG. 7, according to a disclosed embodiment. Regional aerial images marked by pink circles at positions 1001, 1002, 1003 are classified as the target oil palm trees. Regional aerial images marked by blue circles at positions 1016, 1017, 1018 are classified as the non-target objects.

Step 780 may include recognizing the target objects among the one or more regional aerial images based on the classified results. For example, recognizing the target objects of step 780 may include recognizing the oil palm trees among the one or more regional aerial images of the detected oil palm trees in step 730 based on the classified results in step 770. For example, the regional aerial images of the detected oil palm trees 1001, 1002, 1003 in FIG. 10 may be classified as the same of objects in FIG. 9(a) and the outputs from the SVM classifier for them may be all "0s." Accordingly, recognizing the target objects of step 780 may include recognizing the regional aerial images of the detected oil palm trees 1001, 1002, 1003 as the target oil palm trees based on their classification results, "0s." For example, the regional aerial images of the detected oil palm trees 1016, 1017, 1018 in FIG. 10 may be classified as the same of objects in FIG. 9(b) and the outputs from the SVM classifier for them may be all "1s." Accordingly, recognizing the target objects of step 780 may include recognizing the regional aerial images of the detected oil palm trees 1016, 1017, 1018 as the non-target objects based on their classification results, "1s."

In some embodiments, method 700 may include a step 790 acquiring one or more positions of the recognized target objects in step 780. For example, acquiring the positions of the recognized target objects of step 790 may include acquiring the positions of the recognized oil palm trees 1001, 1002, 1003 on the aerial image of the area. In FIG. 10, the recognized oil palm trees are marked by pink circles in the aerial image of the area while the recognized non-target objects are marked by blue circles in the aerial image of the area in the figure. Acquiring the positions of the recognized target objects of step 790 may include acquiring the positions of the recognized oil palm trees marked by pink circles in the aerial image of the area.

In some embodiments, step 790 may further include displaying the one or more positions of the recognized target objects on the aerial image of the area or a map. For example, displaying the recognized target objects of step 790 may include displaying the positions of the one or more recognized oil palm trees 1001, 1002, 1003 on the aerial image of the area. For another example, displaying the recognized target objects of step 790 may include displaying the positions of the one or more recognized oil palm trees on a map of the area based on the association or correspondence between the positions on the aerial image of the area and the map of the area (not shown). For example, a position on the aerial image of the area may be associated with a set of longitude, latitude, and elevation. In some embodiment, displaying the recognized target objects of step 790 may include obtaining the recognized oil palm trees' sets of longitudes, latitudes, and elevations, and displaying the recognized oil palm trees on a map based on the sets of longitudes, latitudes, and/or elevations. For example, displaying the recognized oil palm trees of step 790 may include displaying the recognized oil palm trees on a geographic information system (GIS) map based on the sets of longitudes and latitudes. For another example, displaying the recognized oil palm trees of step 790 may include displaying the recognized oil palm trees on a map based on the sets of longitudes, latitudes, and elevations, such as on a 3D GIS map.

In some embodiments, step 790 may include calculating the number of the recognized target objects. For example, step 790 may include calculating the recognized oil palm trees.

Figure 11:
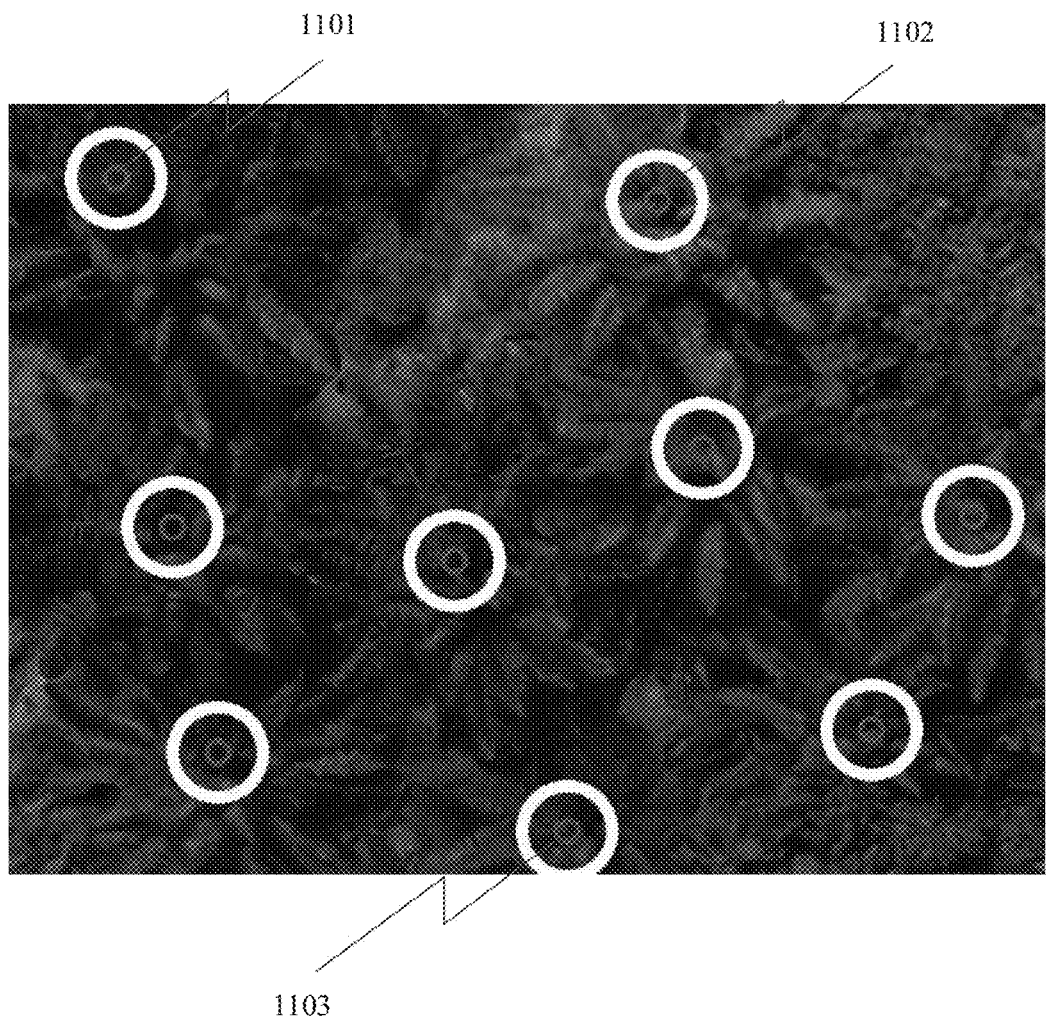
FIG. 11 is an illustration of a partial enlarged view of the exemplary aerial image of the area marked with the positions of the correctly detected and recognized exemplary target objects in accordance with the exemplary method for automatic object detection in FIG. 7, according to a disclosed embodiment.

FIG. 11 is an illustration of a partial enlarged view of the exemplary aerial image of the area marked with the positions of the correctly detected and recognized exemplary target objects in accordance with the exemplary method for automatic object detection in FIG. 7, according to a disclosed embodiment. When Ground Truth information of the target objects is available, it is possible to estimate the accuracy of the aforementioned object detection methods. The white circles 1101, 1102, 1103 in FIG. 11 are exemplary correct detected and recognized oil palm trees.

Figure 12:
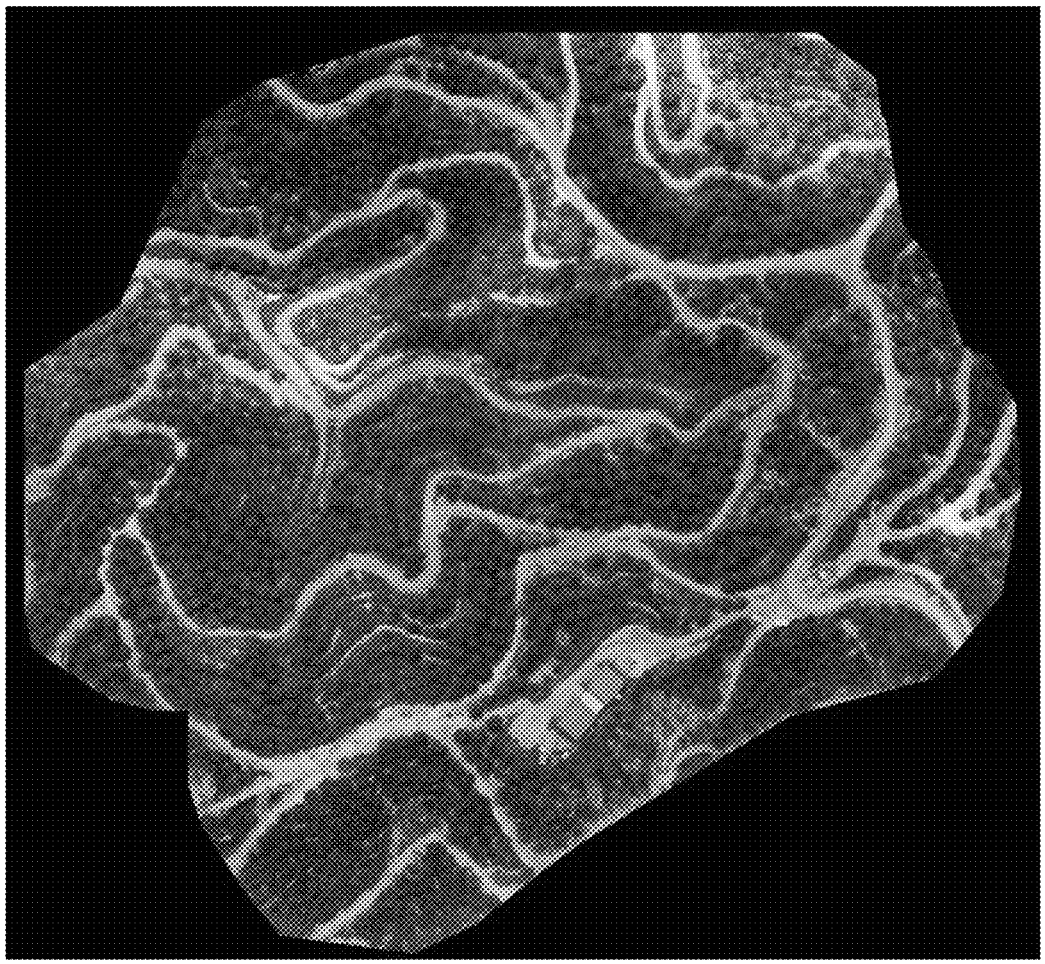
FIG. 12 is an illustration of the exemplary aerial image of the area marked the classification results at the positions of the detected and classified exemplary target objects in accordance with the exemplary method for automatic object detection in FIG. 7, according to a disclosed embodiment.

FIG. 12 is an illustration of the exemplary aerial image of the area marked the classification results at the positions of the detected and classified exemplary target objects in accordance with the exemplary method for automatic object detection in FIG. 7, according to a disclosed embodiment. In the figure, regional aerial images marked by pink circles are recognized as the target oil palm trees, and regional aerial images marked by blue circles are classified as the non-target objects. In an embodiment, the precision and recall of the object detection from aerial imagery may achieve 90.6% and 83.4% respectively while MB-LBP is adopted for feature extraction and the ground sample distance of the images is 3 centimeters.

Another aspect of the present disclosure is directed to a method for detecting objects from aerial imagery performed by one or more integrated circuits, one or more field programmable gate arrays, one or more processors or controllers executing instructions that implement the method, or any combination thereof. The method may include, but not limited to, all the aforementioned methods and embodiments. In some embodiments, a part of steps in the aforementioned methods or embodiments may be performed remotely or separately. In some embodiments, the method may be performed by one or more distributed systems.

Figure 13:
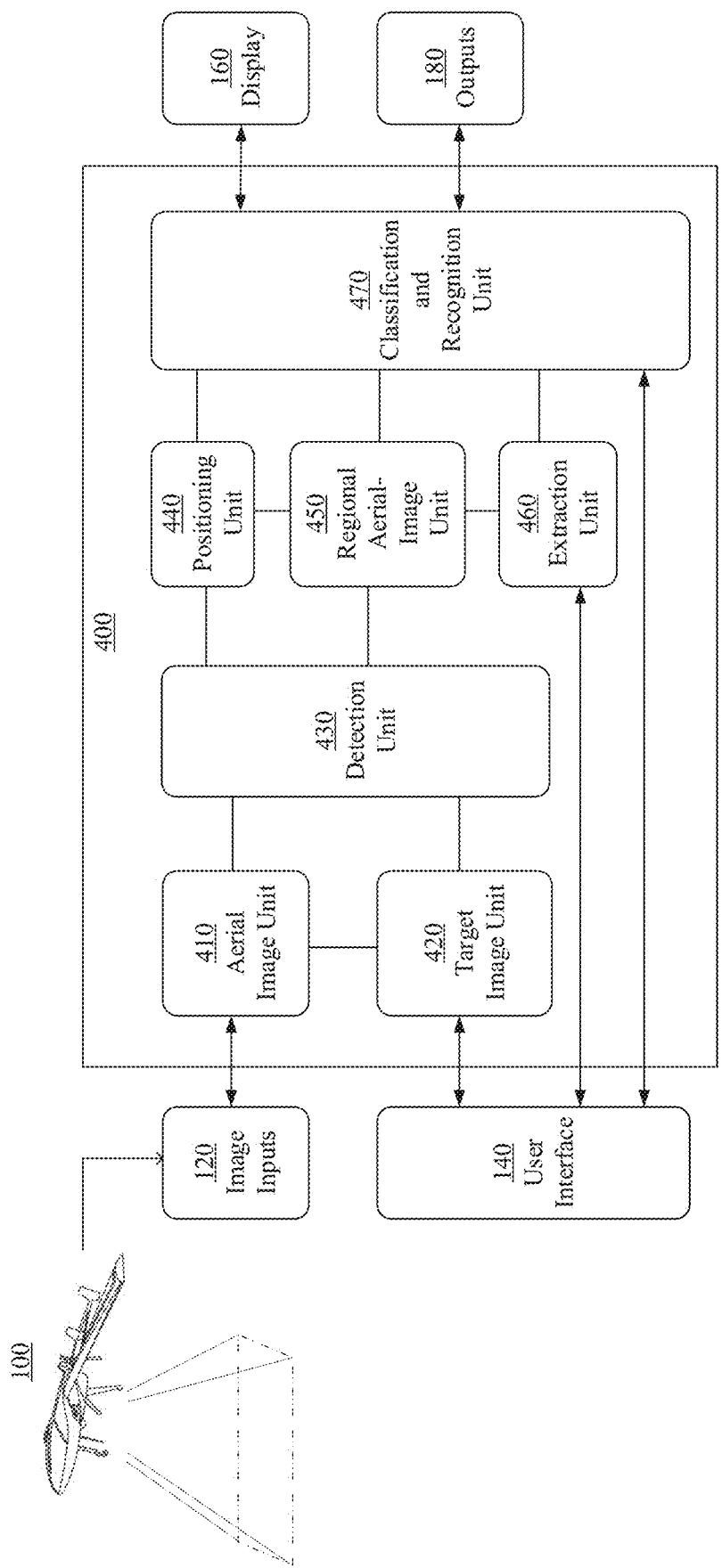
FIG. 13 is a block diagram of an exemplary system for automatic object detection from aerial imagery, according to a disclosed embodiment.

Yet another aspect of the present disclosure is directed to a system for detecting objects from aerial imagery. FIG. 13 is a block diagram of an exemplary system 400 for automatic object detection from aerial imagery, according to a disclosed embodiment. Automatic objection detection system 400 may include an aerial image unit 410 configured to obtain a DSM image of an area, a target image unit 420 configured to obtain a DSM image of a target object, and a detection unit 430 configured to detect the target object in the area based on the DSM images of the area and the target object.

Aerial image unit 410 may include an appropriate type of hardware, such as integrated circuits and field programmable gate array, or software, such as a set of instructions, a subroutine, or a function (i.e. a functional program) executable on a processor or controller, to carry out the aforementioned operations in step 220. Aerial image unit 410 may be configured to obtain a DSM image of an area. In some embodiments, aerial image unit 410 may be communicatively coupled to an image inputs 120. Image input 120 may provide aforementioned various images inputs to aerial image unit 410. For example, image input 120 may receive aerial images of the area, DSMs of the area, and/or DEMs of the area from UAV 100, a drone, an aircraft, a helicopter, a balloon, or a satellite, and transmit these images, DSMs, and/or DEMs of the area to aerial image unit 410. In some embodiments, aerial image unit 410 may also be communicatively coupled to detection unit 430. Aerial image unit 410 may be configured to provide the DSM image of the area and aerial images of the area or parts of the area to detection unit 430. In some embodiments, aerial image unit 410 may also be communicatively coupled to target image unit 420. Aerial image unit 410 may be configured to send the received target images from image inputs 120 to target image unit 420.

Target image unit 420 may include an appropriate type of hardware, such as integrated circuits and field programmable gate array, or software, such as a set of instructions, a subroutine, or a function (i.e. a functional program) executable on a processor or controller, to carry out the aforementioned operations in step 240. Target image unit 420 may be configured to obtain a DSM image of a target object. In some embodiments, target image unit 420 may also be communicatively coupled to a user interface 140. Target image unit 420 may be configured to receive target images from user interface 140. In some embodiments, target image unit 420 may be configured to receive a selection of the target images from user interface 140. In some embodiments, target image unit 420 may also be communicatively coupled to detection unit 430. Target image unit 420 may be configured to send target images to detection unit 430 for object detection.

Detection unit 430 may include an appropriate type of hardware, such as integrated circuits and field programmable gate array, or software, such as a set of instructions, a subroutine, or a function (i.e. a functional program) executable on a processor or controller, to carry out the aforementioned operations in step 260. Detection unit 430 may be configured to detect the target object in the area based on the DSM images of the area and the target object from aerial image unit 410 and target image unit 420. In some embodiments, detection unit 430 may be configured to acquire one or more positions of the detected target objects as the aforementioned operations in step 290. In some embodiments, detection unit 430 may also be communicatively coupled to a display 160. Detection unit 430 may be configured to display the one or more positions of the detected target objects on the aerial image of the area or a map on display 160 as the aforementioned operations in step 290. In some embodiments, detection unit 430 may be configured to calculate the number of the detected target objects as the aforementioned operations in step 290. In some embodiments, detection unit 430 may also be communicatively coupled to an outputs 180. Detection unit 430 may be configured to send the calculated number of the detected target objects to outputs 180.

In some embodiments, automatic objection detection system 400 may include aerial image unit 410, target image unit 420, detection unit 430, a positioning unit 440, a regional aerial-image unit 450, an extraction unit 460, and a classification and recognition unit 470.

Aerial image unit 410 may be further configured to obtain the aerial image of the area corresponding to the DSM image of the area as the aforementioned operations in step 710.

Positioning unit 440 may include an appropriate type of hardware, such as integrated circuits and field programmable gate array, or software, such as a set of instructions, a subroutine, or a function (i.e. a functional program) executable on a processor or controller, to carry out the aforementioned operations in step 720. Positioning unit 440 may be configured to acquire one or more positions of the detected target objects on the aerial image of the area. In some embodiments, positioning unit 440 may be communicatively coupled to detection unit 430. Positioning unit 440 may be configured to receive the detected target objects from detection unit 430, and acquire one or more positions of the detected target objects on the aerial image of the area. In some embodiments, positioning unit 440 may also be communicatively coupled to regional aerial-image unit 450. Positioning unit 440 may be configured to send the acquired positions of the detected target objects to regional aerial-image unit 450. In some embodiments, positioning unit 440 may also be communicatively coupled to classification and recognition unit 470. Positioning unit 440 may be configured to send the acquired positions of the detected target objects to classification and recognition unit 470.

Regional aerial-image unit 450 may include an appropriate type of hardware, such as integrated circuits and field programmable gate array, or software, such as a set of instructions, a subroutine, or a function (i.e. a functional program) executable on a processor or controller, to carry out the aforementioned operations in step 730. Regional aerial-image acquisition unit may be configured to acquire one or more regional aerial images at the one or more positions of the detected target objects. In some embodiments, regional aerial-image unit 450 may also be communicatively coupled to detection unit 430. Regional aerial-image unit 450 may be configured to receive the detected target objects and/or aerial images of the area from detection unit 430. In some embodiments, regional aerial-image unit 450 may also be communicatively coupled to extraction unit 460. Regional aerial-image unit 450 may be configured to send the acquired regional aerial images at the one or more positions of the detected target objects to extraction unit 460. In some embodiments, regional aerial-image unit 450 may also be communicatively coupled to classification and recognition unit 470. Regional aerial-image unit 450 may be configured to send the acquired regional aerial images at the one or more positions of the detected target objects to classification and recognition unit 470.

Extraction unit 460 may include an appropriate type of hardware, such as integrated circuits and field programmable gate array, or software, such as a set of instructions, a subroutine, or a function (i.e. a functional program) executable on a processor or controller, to carry out the aforementioned operations in step 740. Extraction unit 740 may be configured to extract one or more textual features from the one or more regional aerial images as one or more feature vectors. In some embodiments, extraction unit 460 may also be communicatively coupled to regional aerial-image unit 450. Extraction unit 460 may be configured to receive the acquired regional aerial images at the one or more positions of the detected target objects from regional aerial-image unit 450. In some embodiments, extraction unit 460 may also be communicatively coupled to user interface 140. Extraction unit 460 may be configured to receive user input or selection of extraction algorithms from user interface 140. In some embodiments, Extraction unit 460 may also be communicatively coupled to classification and recognition unit 470. Extraction unit 460 may be configured to send the extracted one or more feature vectors to classification and recognition unit 470.

Classification and recognition unit 470 may include an appropriate type of hardware, such as integrated circuits and field programmable gate array, or software, such as a set of instructions, a subroutine, or a function (i.e. a functional program) executable on a processor or controller, to carry out the aforementioned operations in steps 750, 760, 770, and 780. In some embodiments, classification and recognition unit 470 may also be communicatively coupled to user interface 140. Classification and recognition unit 470 may be configured to obtain a plurality of training data from user interface 140. In some embodiments, classification and recognition unit 470 may also be communicatively coupled to positioning unit 440. Classification and recognition unit 470 may be configured to receive the acquired positions of the detected target objects from positioning unit 440. In some embodiments, classification and recognition unit 470 may also be communicatively coupled to regional aerial-image unit 450. Classification and recognition unit 470 may be configured to receive the acquired regional aerial images at the one or more positions of the detected target objects from regional aerial-image unit 450. In some embodiments, classification and recognition unit 470 may also be communicatively coupled to extraction unit 460. Classification and recognition unit 470 may be configured to receive the extracted one or more feature vectors from extraction unit 460.

Classification and recognition unit 470 may be configured to obtain a plurality of training data, the training data including a plurality of aerial images of the same kind of objects as the target object. Classification and recognition unit 470 may be further configured to train a classifier based on the plurality of training data. Classification and recognition unit 470 may be further configured to classify the one or more regional aerial images by the trained classifier in accordance with the one or more feature vectors. Classification and recognition unit 470 may be further configured to recognize the target objects among the one or more regional aerial images based on the classified results.

In some embodiments, classification and recognition unit 470 may be further configured to acquire one or more positions of the recognized target objects as the aforementioned operations in step 790. In some embodiments, classification and recognition unit 470 may also be communicatively coupled to a display 160. Classification and recognition unit 470 may be configured to display the one or more positions of the recognized target objects on the aerial image of the area or a map on display 160 as the aforementioned operations in step 790. In some embodiments, classification and recognition unit 470 may be configured to calculate the number of the detected target objects as the aforementioned operations in step 790. In some embodiments, classification and recognition unit 470 may also be communicatively coupled to an outputs 180. Classification and recognition unit 470 may be configured to send the calculated number of the recognized target objects to outputs 180.

Figure 14:
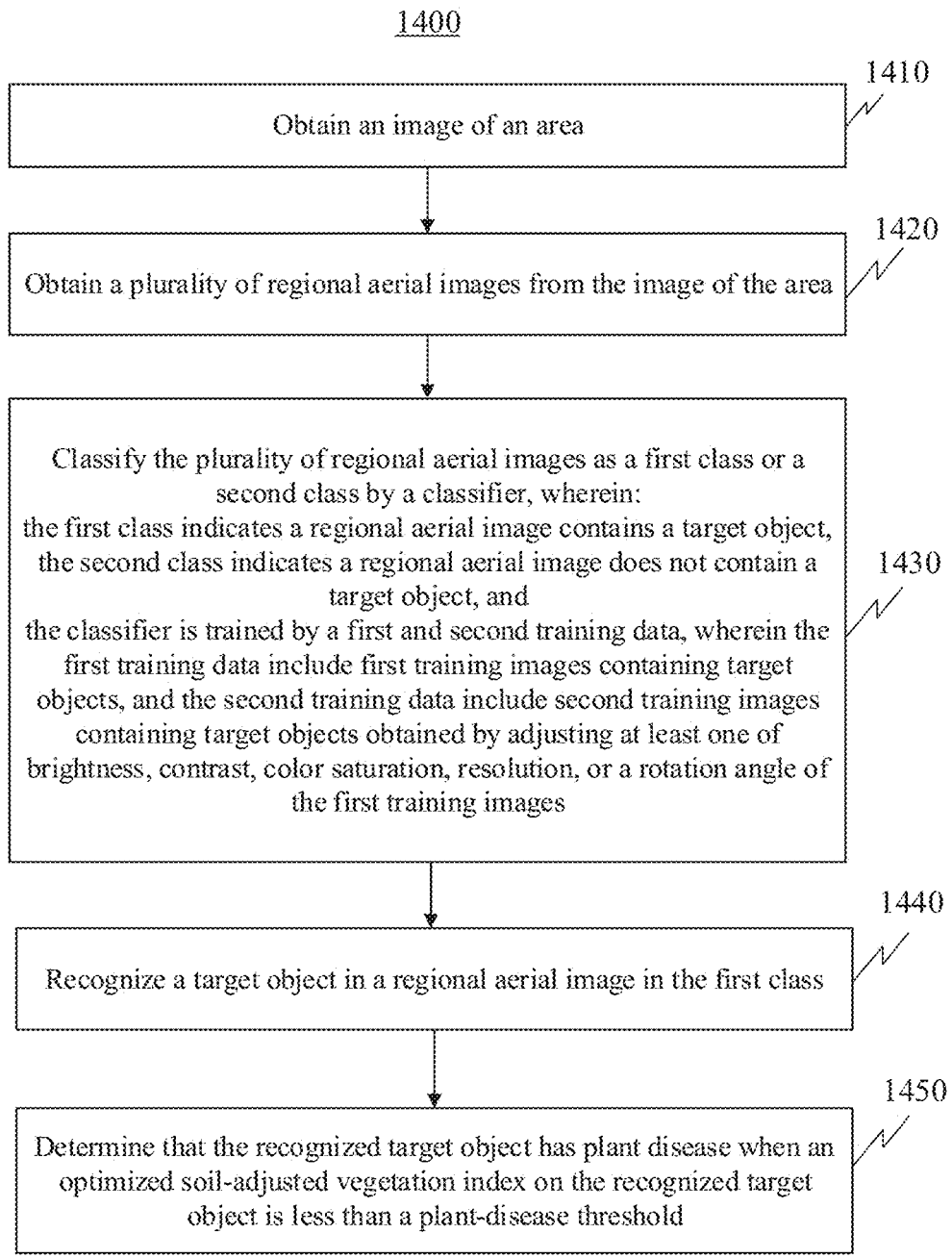
FIG. 14 is a flow chart illustrating an exemplary method for automatic object detection from aerial imagery, according to a disclosed embodiment.

FIG. 14 is a flow chart illustrating an exemplary method 1400 for automatic object detection from aerial imagery, according to a disclosed embodiment. Method 1400 may include the steps of obtaining an image of an area (step 1410), obtaining a plurality of regional aerial images from the image of the area (step 1420), classifying the plurality of regional aerial images as a first class or a second class by a classifier, wherein: the first class indicates a regional aerial image contains a target object, the second class indicates a regional aerial image does not contain a target object, and the classifier is trained by first and second training data, wherein the first training data include first training images containing target objects, and the second training data include second training images containing target objects obtained by adjusting at least one of brightness, contrast, color saturation, resolution, or a rotation angle of the first training images (step 1430), recognizing a target object in a regional aerial image in the first class (step 1440), and determining that the recognized target object has plant disease when an optimized soil-adjusted vegetation index on the recognized target object is less than a plant-disease threshold (step 1450).

Step 1410 may include obtaining an image of an area. For example, obtaining an image of an area of step 1410 may include accessing an image of an area of interest shown in FIG. 1 from a computer-readable medium or computer-readable storage device. As another example, obtaining an image of an area of step 1410 may include receiving an image of an area of interest from an external input, such as image input 120 in FIG. 13. Image input 120 may be communicatively connected to, for example, UAV 100, a drone, an aircraft, a helicopter, a balloon, or a satellite. In other words, obtaining an image of an area of step 1410 may include receiving the image of an area of interest from UAV 100, a drone, an aircraft, a helicopter, a balloon, or a satellite.

In some embodiments, obtaining an image of an area of step 1410 may include obtaining a plurality of images of parts of the area, and combining or stitching the plurality of images of parts of the area to obtain the image of the area of interest. For example, obtaining an image of an area of step 1410 may include obtaining a plurality of RGB images of parts of the area, and identifying and matching distinctive features in the plurality of RGB images of parts of the area to establish correspondences between pairs of RGB images. Obtaining an image of an area of step 1410 may further include blending the plurality of RGB images of parts of the area based on the established correspondences between the pairs of RGB images to obtain the RGB image of the area of interest.

Step 1420 may include obtaining a plurality of regional aerial images from the image of the area. For example, obtaining a plurality of regional aerial images from the image of the area of step 1420 may include obtaining a plurality of 300×300 regional aerial images from the aerial image of the area shown in FIG. 1. In some embodiments, obtaining a plurality of regional aerial images from the image of the area of step 1420 may include acquiring the regional aerial images of step 730 described in method 700.

In some embodiments, obtaining the plurality of regional aerial images of step 1420 may include obtaining the plurality of regional aerial images in accordance with a plurality of locations detected on the image of the area based on a Digital Surface Model (DSM) image of the area and a DSM image of a target object, as described in methods 200 and 700. Alternatively, obtaining the plurality of regional aerial images of step 1420 may include obtaining the plurality of regional aerial images in accordance with a plurality of location candidates on the image of the area. The plurality of location candidates can be, for example, a location candidate per pixel, per ten pixels, or per fifty pixels on the image of the area.

In some embodiments, when a ground sample distance (GSD) of the image of the area is less than or equal to a GSD threshold, obtaining the plurality of regional aerial images of step 1420 may include obtaining the plurality of regional aerial images in accordance with the plurality of locations detected on the image of the area based on the DSM images of the area and the target object, as described in methods 200 and 700. Alternatively, when the GSD of the image of the area is greater than the GSD threshold, obtaining the plurality of regional aerial images of step 1420 may include obtaining the plurality of regional images in accordance with the plurality of location candidates on the image of the area.

Step 1430 may include classifying the plurality of regional aerial images as a first class or a second class by a classifier. The first class indicates a regional aerial image contains a target object. The second class indicates a regional aerial image does not contain a target object. The classifier is trained by first and second training data, in which the first training data include first training images containing target objects, and the second training data include second training images containing target objects obtained by adjusting at least one of brightness, contrast, color saturation, resolution, or a rotation angle of the first training images.

For example, classifying the plurality of regional aerial images as a first class or a second class by a classifier of step 1430 may include classifying the plurality of regional aerial images obtained in step 1420 as the first class indicating a regional aerial image contains a target object or the second class indicating a regional aerial image does not contain a target object. When target objects are oil palm trees in FIG. 1, classifying the plurality of regional aerial images of step 1430 may include classifying one or more of the plurality of regional aerial images as the first class, in which regional aerial images contain oil palm trees. Alternatively, classifying the plurality of regional aerial images of step 1430 may include classifying one or more of the plurality of regional aerial images as the second class, in which regional aerial images do not contain oil palm trees.

In step 1430, classifying the plurality of regional aerial images may include classifying the plurality of regional aerial images by a classifier that is trained by first and second training data. The first training data may include first training images containing target objects, such as oil palm trees in FIG. 9(*a*). In some embodiments, the classifier of step 1430 may be trained as step 760 in method 700.

Figure 15:
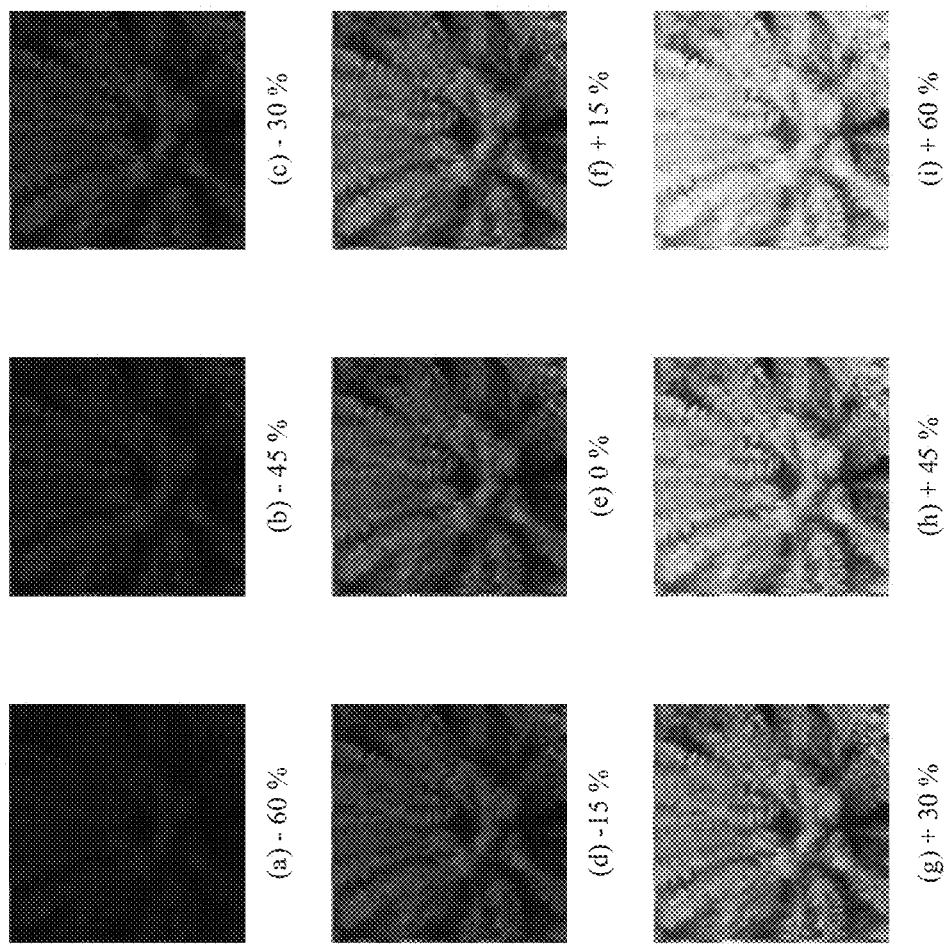
FIG. 15 is an illustration of a plurality of exemplary training images containing target objects with varied brightness that may be utilized to train an exemplary classifier for automatic object detection, according to a disclosed embodiment.

The second training data may include second training images containing target objects obtained by adjusting at least one of brightness, contrast, color saturation, resolution, or a rotation angle of the first training images. For example, the second training images may include one or more of images containing oil palm trees as shown in FIG. 15 with varied brightness, FIG. 16 with varied contrast, FIG. 17 with varied color saturation, FIG. 18 with varied resolution, and FIG. 19 with varied rotation angles, which are obtained by adjusting brightness, contrast, color saturation, resolution, and/or a rotation angle of the oil palm trees in FIG. 9(*a*).

In some embodiments, when the second training data includes second training images obtained by adjusting all of brightness, contrast, color saturation, resolution, and a rotation angle of the first training images, the classifier can increase recognition rates of the oil palm trees, for example, from 70% to 90%.

In some embodiments, classifying the plurality of regional aerial images of step 1430 comprises determining whether appearance of a target object in a training image is rotational symmetric, and in response to determination that the appearance of the target object is not rotational symmetric, obtaining the second training images by adjusting the rotation angle of the first training images. For example, an aerial image of an oil palm tree may not be rotational symmetric. In other words, the oil palm tree looks different in the aerial image after rotating an angle. Classifying the plurality of regional aerial images of step 1430 may include determining appearance of oil palm trees is not rotational symmetric. In response to such determination, step 1430 may also include obtaining the second training images by adjusting the rotation angle of the oil palm trees. The classifier is therefore trained by oil palm tree images with different rotation angles.

Alternatively, when a basketball is a target object, its aerial image may be rotational symmetric, step 1430 may include determining appearance of basketballs is rotational symmetric. In response to the determination, step 1430 may also not include obtaining the second training images by adjusting the rotation angle of the oil palm trees. The classifier is not trained by oil palm tree images with different rotation angles.

In some embodiments, the rotation angle comprises an angle larger than a zero degree and less than 360 degrees. For example, an aerial image of a person or an animal may look different after rotating an angle larger than a zero degree and less than 360 degrees.

Step 1440 may include recognizing a target object in a regional aerial image in the first class. For example, recognizing a target object in the first class of step 1440 may include recognize an oil palm tree among one or more images classified as the first class in step 1430. In some embodiments, recognizing a target object in the first class of step 1440 may include recognizing the target objects of step 780 in method 700.

Step 1450 may include determining that the recognized target object has plant disease when an optimized soil-adjusted vegetation index on the recognized target object is less than a plant-disease threshold. For example, determining that the recognized target object has plant disease of step 1450 may include obtaining a plurality of optimized soil-adjusted vegetation indices (OSAVIs) on the recognized oil palm trees in the first class, comparing the plurality of OSAVIs with a plant-disease threshold, and determining that one or more oil palm trees have plant diseases when their OSAVIs are less than the plant-disease threshold. The plant-disease threshold for oil palm trees can be, for example, 0.85, i.e., OSAVI=0.85. When the plurality of OSAVIs on one or more of the recognized oil palm trees are less than 0.85, determining that the one or more recognized target objects have plant diseases.

An OSAVI is a vegetation index that accounted for the differential red and near-infrared extinction through the vegetation canopy. The OSAVI minimizes soil brightness influences from spectral vegetation indices involving red and near-infrared (NIR) wavelengths. The OSAVI can be obtained by: OSAVI=(1+L)*(NIR−RED)/(NIR+RED+L, where L=0.16, NIR is a near-infrared band index, and RED is a red band index on the recognized target object. NIR and RED can be obtained from a multispectral image of the area of interest took by a multispectral camera.

FIG. 15 is an illustration of a plurality of exemplary training images containing target objects with varied brightness that may be utilized to train an exemplary classifier for automatic object detection, according to a disclosed embodiment. FIGS. 15(a), 15(b), 15(c), 15(d), 15(e), 15(f), 15(g), 15(h), and 15(i) are images containing oil palm trees with varied brightness levels of −60%, −45%, −30%, −15%, 0%, +15%, +30%, +45%, and +60%, respectively. One or more of these images with varied brightness may be used to train the classifier of step 1430. Since aerial images of an area may vary in brightness, the classifier trained by these training images can increase recognition rates of the oil palm trees, for example, from 70% to 80%.

Figure 16:
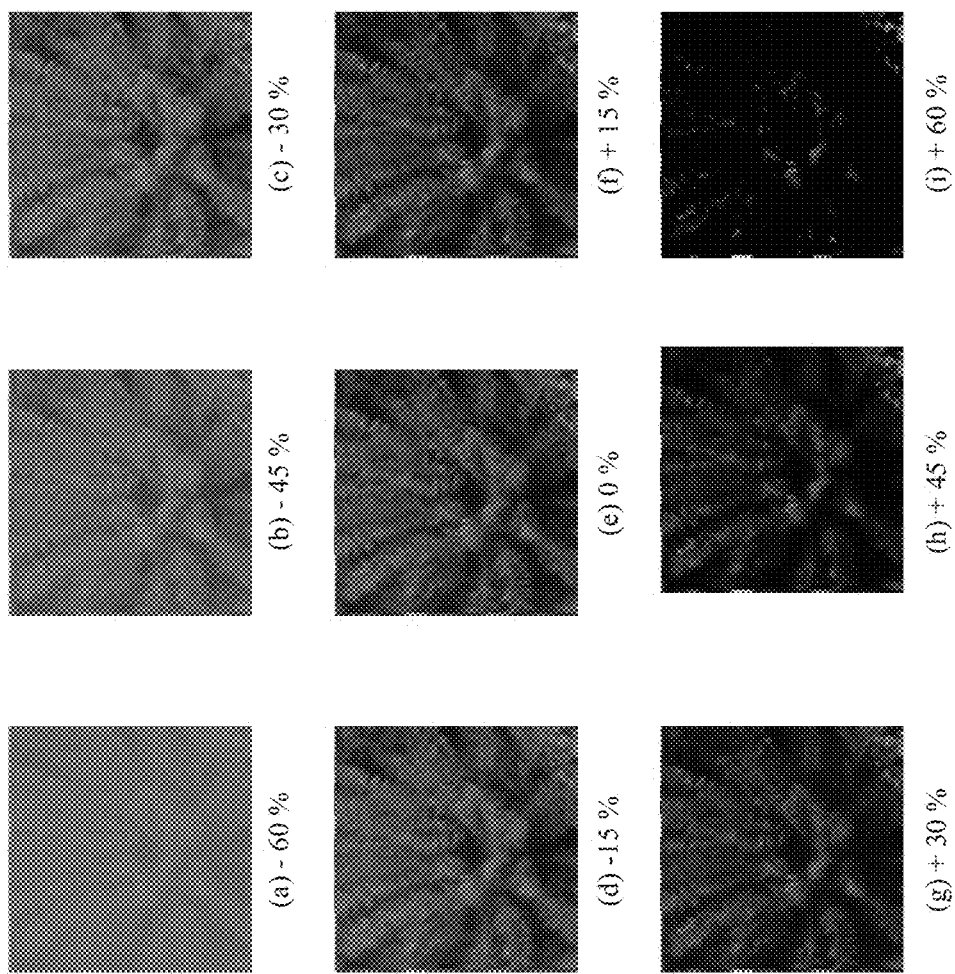
FIG. 16 is an illustration of a plurality of exemplary training images containing target objects with varied contrast that may be utilized to train an exemplary classifier for automatic object detection, according to a disclosed embodiment.

FIG. 16 is an illustration of a plurality of exemplary training images containing target objects with varied contrast that may be utilized to train an exemplary classifier for automatic object detection, according to a disclosed embodiment. FIGS. 16(a), 16(b), 16(c), 16(d), 16(e), 16(f), 16(g), 16(h), and 16(i) are images containing oil palm trees with varied contrast levels of −60%, −45%, −30%, −15%, 0%, +15%, +30%, +45%, and +60%, respectively. One or more of these images with varied contrast may be used to train the classifier of step 1430. Since aerial images of an area may vary in contrast, the classifier trained by these training images can increase recognition rates of the oil palm trees, for example, from 75% to 85%.

Figure 17:
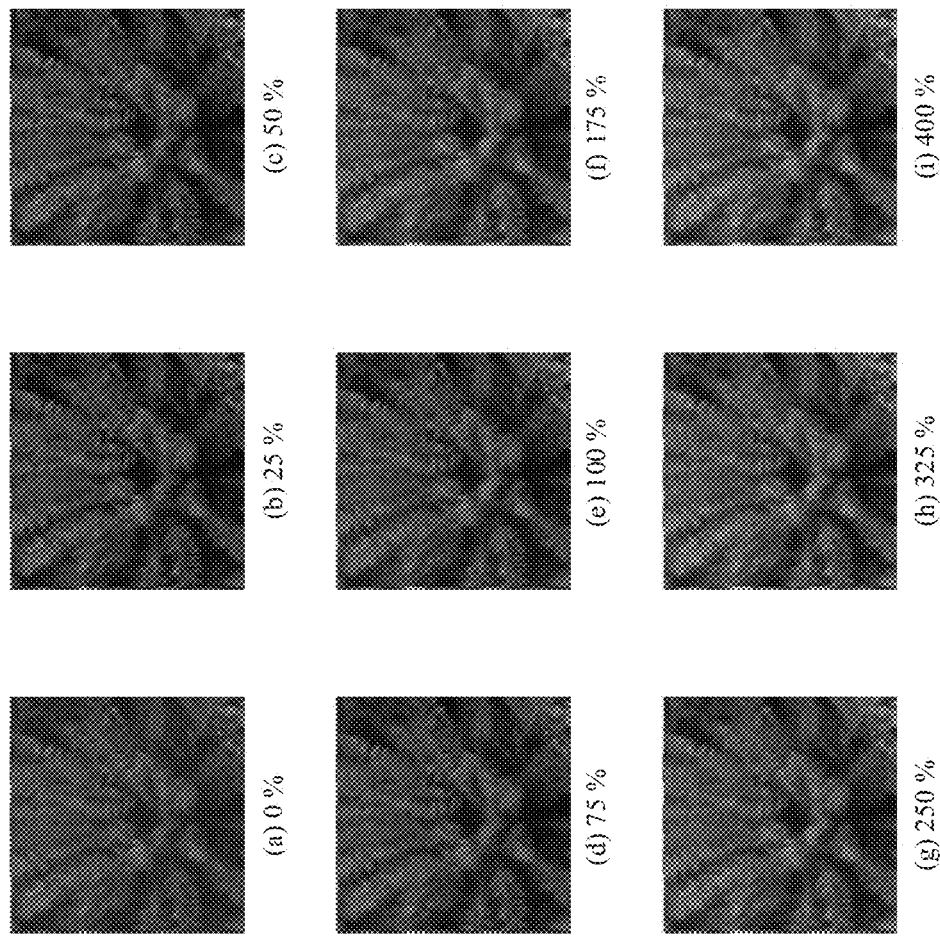
FIG. 17 is an illustration of a plurality of exemplary training images containing target objects with varied color saturation that may be utilized to train an exemplary classifier for automatic object detection, according to a disclosed embodiment.

FIG. 17 is an illustration of a plurality of exemplary training images containing target objects with varied color saturation that may be utilized to train an exemplary classifier for automatic object detection, according to a disclosed embodiment. FIGS. 17(a), 17(b), 17(c), 17(d), 17(e), 17(f), 17(g), 17(h), and 17(i) are images containing oil palm trees with varied color saturation levels of 0%, 25%, 50%, 75%, 100%, 175%, 250%, 325%, and 400%, respectively. One or more of these images with varied color saturation may be used to train the classifier of step 1430. Since aerial images of an area may vary in color saturation, the classifier trained by these training images can increase recognition rates of the oil palm trees, for example, from 72% to 80%.

Figure 18:
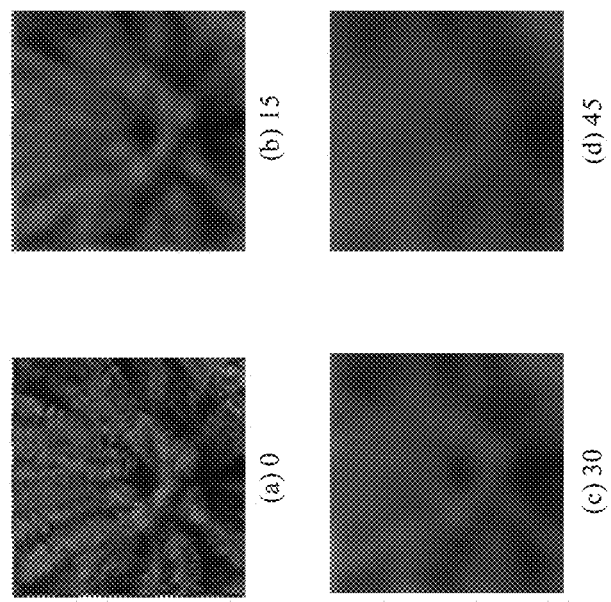
FIG. 18 is an illustration of a plurality of exemplary training images containing target objects with varied resolution that may be utilized to train an exemplary classifier for automatic object detection, according to a disclosed embodiment.

FIG. 18 is an illustration of a plurality of exemplary training images containing target objects with varied resolution that may be utilized to train an exemplary classifier for automatic object detection, according to a disclosed embodiment. FIGS. 18(a), 18(b), 18(c), and 18(d) are images containing oil palm trees with varied blur levels of 0, 15, 30, and 45, respectively. One or more of these images with varied color saturation may be used to train the classifier of step 1430. Since aerial images of an area may vary in resolution, the classifier trained by these training images can increase recognition rates of the oil palm trees, for example, from 72% to 86%.

Figure 19:
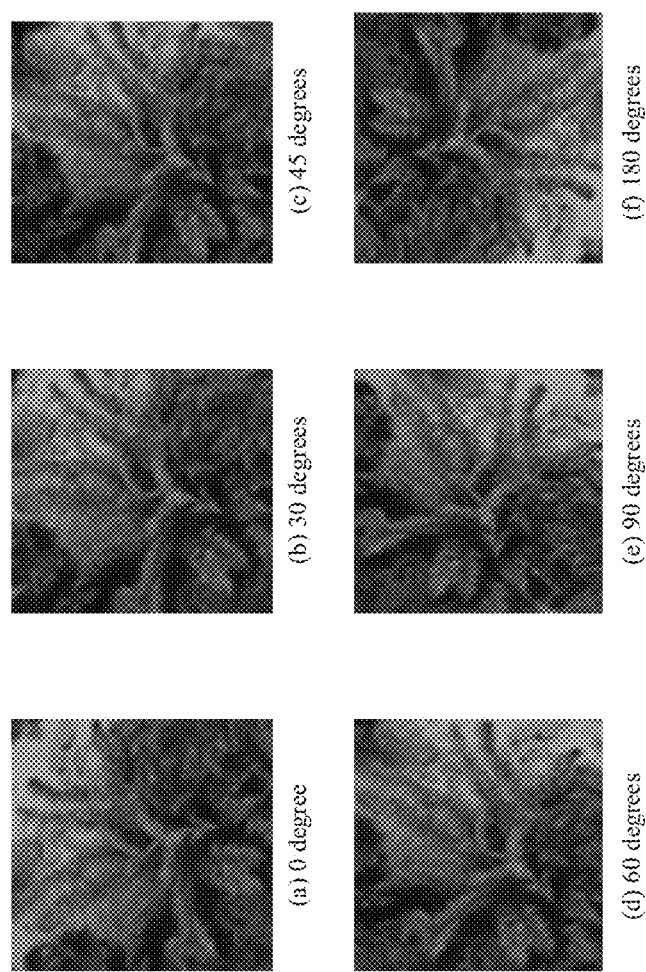
FIG. 19 is an illustration of a plurality of exemplary training images containing target objects with varied rotation angles that may be utilized to train an exemplary classifier for automatic object detection, according to a disclosed embodiment.

FIG. 19 is an illustration of a plurality of exemplary training images containing target objects with varied rotation angles that may be utilized to train an exemplary classifier for automatic object detection, according to a disclosed embodiment. FIGS. 19(a), 19(b), 19(c), 19(d), 19(e), and 19(f) are images containing oil palm trees with different rotation angles of 0 degree, 30 degrees, 45 degrees, 60 degrees, 90 degrees, and 180 degrees, respectively. One or more of these images with varied rotation angles may be used to train the classifier of step 1430. Since target objects in the aerial images of an area may vary in angles, the classifier trained by these training images can increase recognition rates of the oil palm trees, for example, from 75% to 86%.

Figure 20:
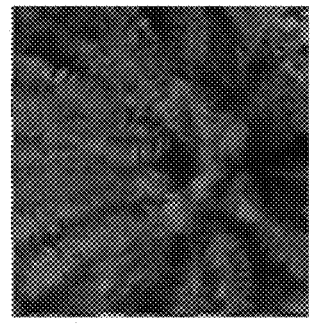
FIG. 20 is an illustration of a plurality of exemplary training images containing target objects with different sizes that may be utilized to train an exemplary classifier for automatic object detection, according to a disclosed embodiment.
Figure 20:
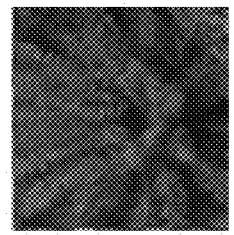

FIG. 20 is an illustration of a plurality of exemplary training images containing target objects with different sizes that may be utilized to train an exemplary classifier for automatic object detection, according to a disclosed embodiment. For example, as shown in FIG. 20(a), a training image contains a small, young palm tree as a target object. As shown in FIG. 20(b), a training image contains a large, mature palm tree as another target object. The target objects in the first training images of step 1430 may include these two oil palm trees of different sizes. The classifier trained by these training images may increase recognition rates of the oil palm trees, for example, from 82% to 86% because it can recognize those young oil palm trees as well as mature oil palm trees in the area of interest.

Figure 21:
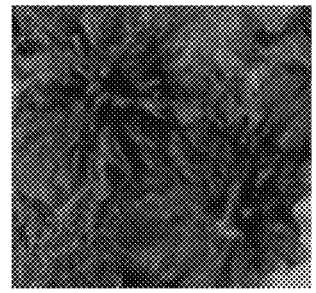
FIG. 21 is an illustration of a plurality of exemplary training images containing two or more target objects that may be utilized to train an exemplary classifier for automatic object detection, according to a disclosed embodiment.
Figure 21:
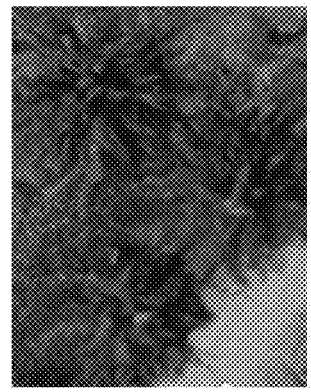

FIG. 21 is an illustration of a plurality of exemplary training images containing two or more target objects that may be utilized to train an exemplary classifier for automatic object detection, according to a disclosed embodiment. For example, as shown in FIG. 21(a), a training image containing two palm trees as target objects. As shown in FIG. 21(b), a training image containing three palm trees as target objects. The target objects in the first training images of step 1430 may include these images containing two or more oil palm trees. The classifier trained by these training images may increase recognition rates of the oil palm trees, for example, from 81% to 85% because it can recognize two or more oil palm trees in a regional aerial image. It may be inevitable to have two or more oil palm trees in a regional aerial image obtained in step 1420 because a fixed image size, e.g., 300×300, may be used for all regional aerial images and oil palm trees may disperse in the area randomly.

Figure 22:
FIG. 22 is an illustration of a plurality of exemplary training images containing non-target objects in the image of the area that may be utilized to train an exemplary classifier for automatic object detection, according to a disclosed embodiment.

FIG. 22 is an illustration of a plurality of exemplary training images containing non-target objects in the image of the area that may be utilized to train an exemplary classifier for automatic object detection, according to a disclosed embodiment. FIGS. 22(a), 22(b), 22(c), and 22(d) contain a house, another house, a car, and two cars, respectively. The classifier in step 1430 may be trained by a first number of training images including the first and second pluralities of training images in FIGS. 9(a) and 15-21, and a second number of training images containing non-target objects in FIGS. 9(b) and/or 22. The first number of training images may be substantially equal to the second number of training images. For example, the first and second numbers may both be ten thousand. The classifier trained by these training images may increase recognition rates of the oil palm trees up to, for example, 90% because these training images provide a variety of features for the classifier.

Figure 23:
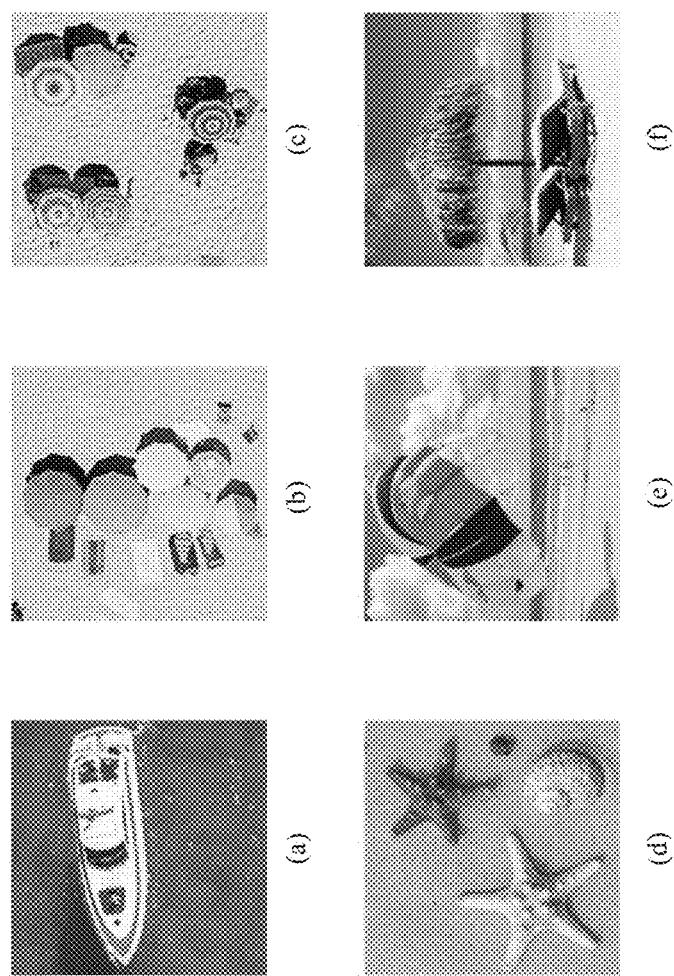
FIG. 23 is an illustration of a plurality of exemplary training images containing non-target objects not in the image of the area that may be utilized to train an exemplary classifier for automatic object detection, according to a disclosed embodiment.

FIG. 23 is an illustration of a plurality of exemplary training images containing non-target objects not in the image of the area that may be utilized to train an exemplary classifier for automatic object detection, according to a disclosed embodiment. FIGS. 23(a), 23(b), 23(c), 23(d), 23(e), and 23(f) contain scenes at a beach, which are not in the image of the area in FIG. 1. The classifier of step 1430 may be trained by a first number of training images including the first and second training images in FIGS. 9(a) and 15-21, a second number of training images containing non-target objects in the image of the area in FIGS. 9(b) and/or 22, and a third number of training images containing non-target objects in FIG. 23 that are not in the image of the area. In some embodiments, the first, second, and third numbers of training images are substantially equal. For example, the first, second, and third numbers may all be eight thousand.

Figure 24:
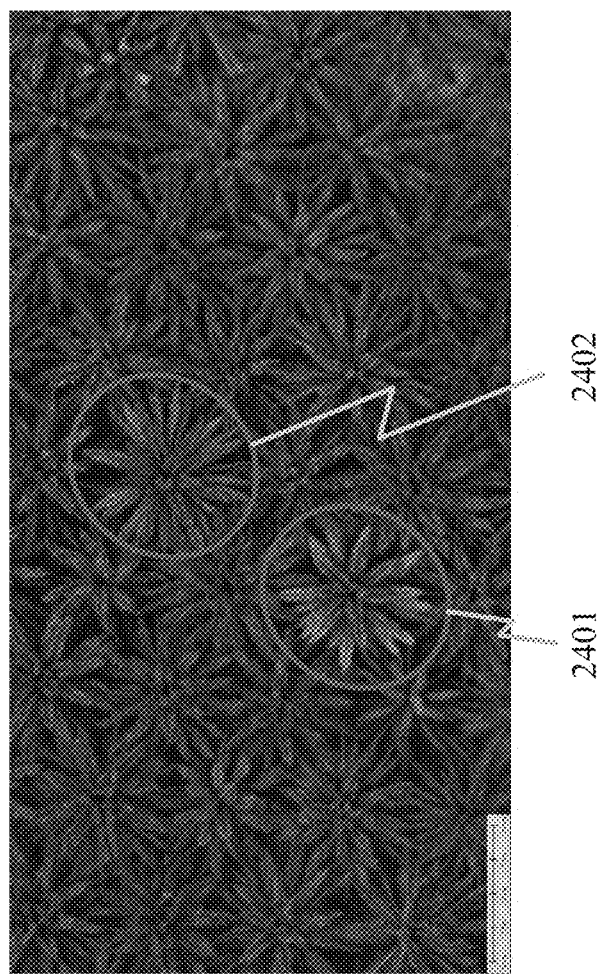
FIG. 24 is an illustration of target objects with plant disease in the area, according to a disclosed embodiment.

FIG. 24 is an illustration of target objects with plant disease in the area, according to a disclosed embodiment. As shown in FIG. 24, oil palm trees 2401 and 2402 have dead leaves. Those dead leaves may cause different reflections in different bands, such as blue, green, red, and near-infrared bands. UAV 100 may also be configured to take multispectral images of the area by a multispectral camera. The OSAVIs of oil palm trees 2401 and 2402 may be 0.79 and 0.81, respectively.

After recognizing oil palm trees 2401 and 2402 by step 1440, determining that the recognized target object has plant disease in step 1450 may include comparing the OSAVIs of oil palm trees 2401 and 2402 with an OSAVI threshold, e.g., 0.85, and determining that oil palm trees 2401 and 2402 both have plant diseases. Farmers can obtain locations of these oil palm trees with plant diseases by the methods herein and take some actions to rescue these oil palm trees.

Another aspect of the present disclosure is directed to a system for detecting objects from aerial imagery. FIG. 13 is a block diagram of an exemplary system 400 for automatic object detection from aerial imagery, according to a disclosed embodiment. Automatic objection detection system 400 may be configured to perform method 1400 as described above and shown in FIGS. 14-24.

Yet another aspect of the present disclosure is directed to a non-transitory computer-readable medium storing instructions which, when executed, cause one or more processors to perform operations for detecting objects from aerial imagery. The operations may include, but not limited to, all the aforementioned methods and embodiments. In some embodiments, a part of steps in the aforementioned operations or embodiments may be performed remotely or separately. In some embodiments, the operations may be performed by one or more distributed systems.

It will be apparent to those skilled in the art that various modifications and variations can be made to the disclosed methods and systems for detecting objects from aerial imagery. Other embodiments will be apparent to those skilled in the art from consideration of the specification and practice of the disclosed methods and systems for detecting objects from aerial imagery. It is intended that the specification and examples be considered as exemplary only, with a true scope being indicated by the following claims and their equivalents.

What is claimed is:

1. A system for detecting objects from aerial imagery, the system comprising:
   memory for storing instructions;
   at least one processor configured to execute the instructions to:
   obtaining an image of an area;
   obtaining a plurality of regional aerial images from the image of the area;
   classifying the plurality of regional aerial images as a first class or a second class by a classifier, wherein:
   the first class indicates a regional aerial image contains a target object,
   the second class indicates a regional aerial image does not contain a target object, and
   the classifier is trained by first and second training data, wherein the first training data include first training images containing target objects, and the second training data include second training images containing target objects obtained by adjusting at least one of brightness, contrast, color saturation, resolution, or a rotation angle of the first training images; and
   recognizing a target object in a regional aerial image in the first class.

2. The system of claim 1, wherein classifying the plurality of regional aerial images comprises:
   determining whether appearance of a target object in a training image is rotational symmetric; and
   responsive to determination that the appearance of the target object is not rotational symmetric, obtaining the second training images by adjusting the rotation angle of the first training images.

3. The system of claim 1, wherein the rotation angle comprises an angle larger than a zero degree and less than 360 degrees.

4. The system of claim 1, wherein obtaining the plurality of regional aerial images comprises:
   obtaining the plurality of regional aerial images in accordance with a plurality of locations detected on the image of the area based on a Digital Surface Model (DSM) image of the area and a DSM image of a target object; or
   obtaining the plurality of regional aerial images in accordance with a plurality of location candidates on the image of the area.

5. The system of claim 4, wherein:
   when a ground sample distance (GSD) of the image of the area is less than or equal to a GSD threshold, obtaining the plurality of regional aerial images comprises obtaining the plurality of regional aerial images in accordance with the plurality of locations detected on the image of the area based on the DSM images of the area and the target object; and
   when the GSD of the image of the area is greater than the GSD threshold, obtaining the plurality of regional aerial images comprises obtaining the plurality of regional images in accordance with the plurality of location candidates on the image of the area.

6. The system of claim 1, wherein the target objects in the first training images comprise two different sizes.

7. The system of claim 1, wherein one of the first training images contains two target objects.

8. The system of claim 1, wherein the classifier is trained by:
   a first number of training images including the first and second pluralities of training images; and
   a second number of training images containing non-target objects,
   wherein the first number of training images is substantially equal to the second number of training images.

9. The system of claim 1, wherein the classifier is trained by:
   a first number of training images including the first and second training images;
   a second number of training images containing non-target objects in the image of the area; and
   a third number of training images containing non-target objects that are not in the image of the area.

10. The system of claim 9, wherein the first, second, and third numbers of training images are substantially equal.

11. The system of claim 1, wherein the at least one processor is configured to execute the instructions to:
    determine that the recognized target object has plant disease when an optimized soil-adjusted vegetation index on the recognized target object is less than a plant-disease threshold.

12. A method for detecting objects from aerial imagery, the method comprising:
    obtaining an image of an area;
    obtaining a plurality of regional aerial images from the image of the area;
    classifying the plurality of regional aerial images as a first class or a second class by a classifier, wherein:
        the first class indicates a regional aerial image contains a target object,
        the second class indicates a regional aerial image does not contain a target object, and
        the classifier is trained by first and second training data, wherein the first training data include first training images containing target objects, and the second training data include second training images containing target objects obtained by adjusting at least one of brightness, contrast, color saturation, resolution, or a rotation angle of the first training images; and
    recognizing a target object in a regional aerial image in the first class.

13. The method of claim 12, wherein classifying the plurality of regional aerial images comprises:
    determining whether appearance of a target object in a training image is rotational symmetric; and
    responsive to determination that the appearance of the target object is not rotational symmetric, obtaining the second training images by adjusting the rotation angle of the first training images.

14. The method of claim 12, wherein obtaining the plurality of regional aerial images comprises:
    obtaining the plurality of regional aerial images in accordance with a plurality of locations detected on the image of the area based on a Digital Surface Model (DSM) image of the area and a DSM image of a target object; or
    obtaining the plurality of regional aerial images in accordance with a plurality of location candidates on the image of the area.

15. The method of claim 14, wherein:
    when a ground sample distance (GSD) of the image of the area is less than or equal to a GSD threshold, obtaining the plurality of regional aerial images comprises obtaining the plurality of regional aerial images in accordance with the plurality of locations detected on the image of the area based on the DSM images of the area and the target object; and
    when the GSD of the image of the area is greater than the GSD threshold, obtaining the plurality of regional aerial images comprises obtaining the plurality of regional images in accordance with the plurality of location candidates on the image of the area.

16. The method of claim 12, wherein the target objects in the first training images comprise two different sizes.

17. The method of claim 12, wherein the classifier is trained by:
    a first number of training images including the first and second pluralities of training images; and
    a second number of training images containing non-target objects,
    wherein the first number of training images is substantially equal to the second number of training images.

18. The method of claim 12, wherein the classifier is trained by:
    a first number of training images including the first and second training images;
    a second number of training images containing non-target objects in the image of the area; and
    a third number of training images containing non-target objects that are not in the image of the area.

19. The method of claim 18, wherein the first, second, and third numbers of training images are substantially equal.

20. The method of claim 12, comprising:
    determining that the recognized target object has plant disease when an optimized soil-adjusted vegetation index on the recognized target object is less than a plant-disease threshold.

21. A non-transitory computer-readable medium storing instructions which, when executed, cause one or more processors to perform operations for detecting objects from aerial imagery, the operations comprising:
    obtaining an image of an area;
    obtaining a plurality of regional aerial images from the image of the area;
    classifying the plurality of regional aerial images as a first class or a second class by a classifier, wherein:
        the first class indicates a regional aerial image contains a target object,
        the second class indicates a regional aerial image does not contain a target object, and
        the classifier is trained by first and second training data, wherein the first training data include first training images containing target objects, and the second training data include second training images containing target objects obtained by adjusting at least one of brightness, contrast, color saturation, resolution, or a rotation angle of the first training images; and
    recognizing a target object in a regional aerial image in the first class.

22. The non-transitory computer-readable medium of claim 21, wherein classifying the plurality of regional aerial images comprises:
    determining whether appearance of a target object in a training image is rotational symmetric; and
    responsive to determination that the appearance of the target object is not rotational symmetric, obtaining the second training images by adjusting the rotation angle of the first training images.

23. The non-transitory computer-readable medium of claim 21, wherein the operations comprise:
    determining that the recognized target object has plant disease when an optimized soil-adjusted vegetation index on the recognized target object is less than a plant-disease threshold.

* * * * *